US011352124B2

(12) United States Patent
Barr et al.

(10) Patent No.: US 11,352,124 B2
(45) Date of Patent: Jun. 7, 2022

(54) CONTINUOUS SKIN LEADING EDGE SLATS

(71) Applicant: The Boeing Company, Chicago, IL (US)

(72) Inventors: Mark A. Barr, Seattle, WA (US); Stephen R. Amorosi, Seattle, WA (US); Matthew L. Anderson, Carnation, WA (US); Ramon A. Burin, Lake Stevens, WA (US); Michael R. Severance, Seattle, WA (US)

(73) Assignee: The Boeing Company, Chicago, IL (US)

( * ) Notice: Subject to any disclaimer, the term of this patent is extended or adjusted under 35 U.S.C. 154(b) by 270 days.

(21) Appl. No.: 16/671,888

(22) Filed: Nov. 1, 2019

(65) Prior Publication Data

US 2021/0129974 A1 May 6, 2021

(51) Int. Cl.
*B64C 9/24* (2006.01)
*B64F 5/10* (2017.01)
*B64C 3/18* (2006.01)
*B64C 3/14* (2006.01)

(52) U.S. Cl.
CPC ............... *B64C 9/24* (2013.01); *B64C 3/185* (2013.01); *B64F 5/10* (2017.01); *B64C 2003/146* (2013.01)

(58) Field of Classification Search
CPC .... B64C 9/24; B64C 3/50; B64C 3/54; B64C 3/185; B64C 3/187; B64C 3/00; B64C 3/10; B64C 3/16; B64C 3/18; B64C 3/182; B64C 3/28; B64C 3/26; B64C 2003/146; B64F 5/00; B64F 5/10
See application file for complete search history.

(56) References Cited

U.S. PATENT DOCUMENTS

| 4,285,482 A | 8/1981 | Lewis |
| 7,909,952 B2* | 3/2011 | Kato ................... C09J 5/06 156/92 |
| 9,896,190 B1 | 2/2018 | Amorosi et al. |
| 2007/0107189 A1* | 5/2007 | Prichard ............... B64C 3/24 29/448 |
| 2012/0193473 A1 | 8/2012 | Casado Abarquero et al. |

(Continued)

FOREIGN PATENT DOCUMENTS

| EP | 2842867 | 3/2015 |
| EP | 3670331 | 6/2020 |

OTHER PUBLICATIONS

European Patent Office, "Extended European Search Report," issued in connection with European Patent Application No. 20198634.6, dated Mar. 15, 2021, 10 pages.

*Primary Examiner* — Joshua J Michener
*Assistant Examiner* — Cindi M Curry
(74) *Attorney, Agent, or Firm* — Hanley, Flight & Zimmerman, LLC

(57) ABSTRACT

Continuous skin leading edge slats are disclosed. A disclosed example leading edge slat for use with an aircraft includes a single-piece nose skin defining upper and lower external surfaces of the leading edge slat, where the single-piece nose skin is to extend between a fore end and an aft end of the leading edge slat, and a box spar coupled to an inner surface of the single-piece nose skin. The box spar includes lateral walls extending away from the inner surface of the single-piece nose skin. The lateral walls define at least one compartment of the box spar.

21 Claims, 22 Drawing Sheets

(56) References Cited

U.S. PATENT DOCUMENTS

2013/0320142 A1* 12/2013 Nordman .......... B29C 66/73756
  244/123.5
2021/0060886 A1* 3/2021 Torske ............... B29D 99/0028

* cited by examiner

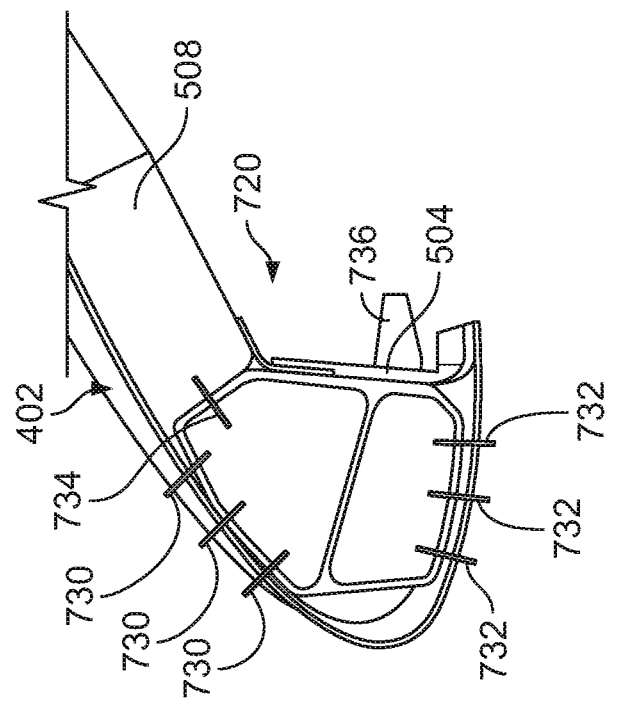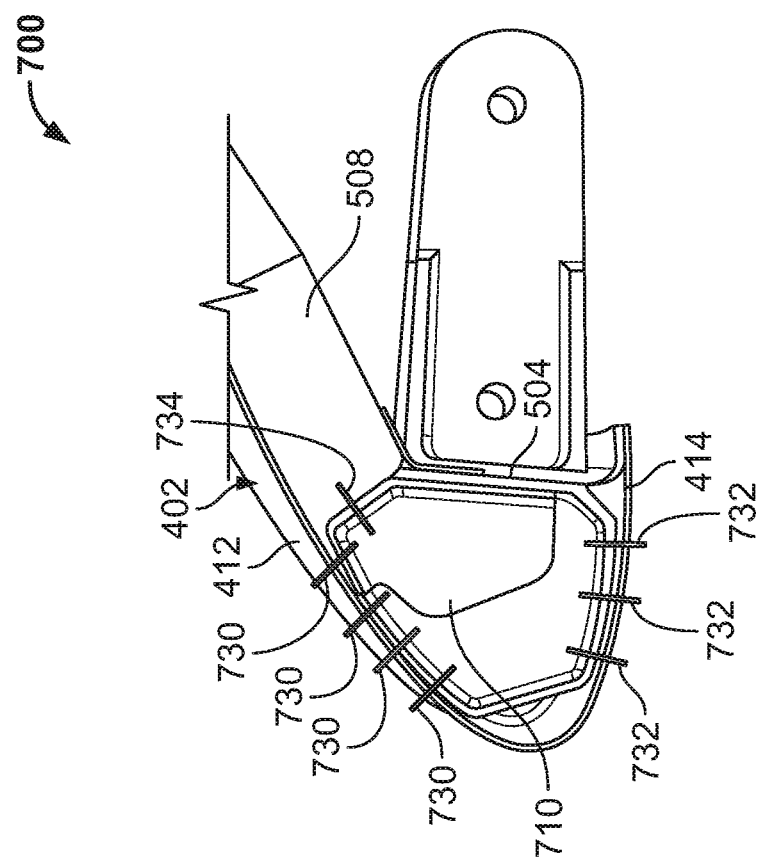

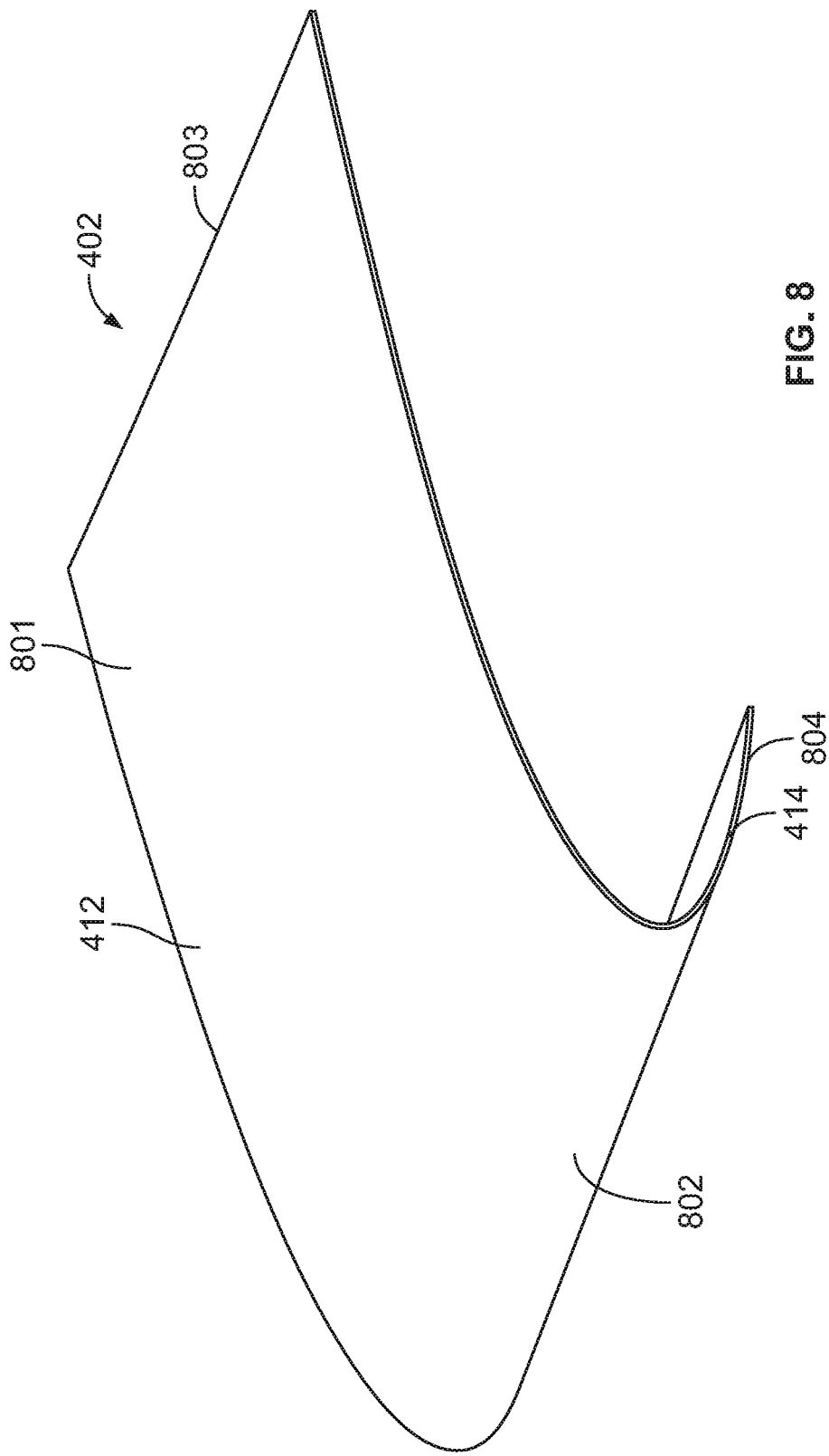

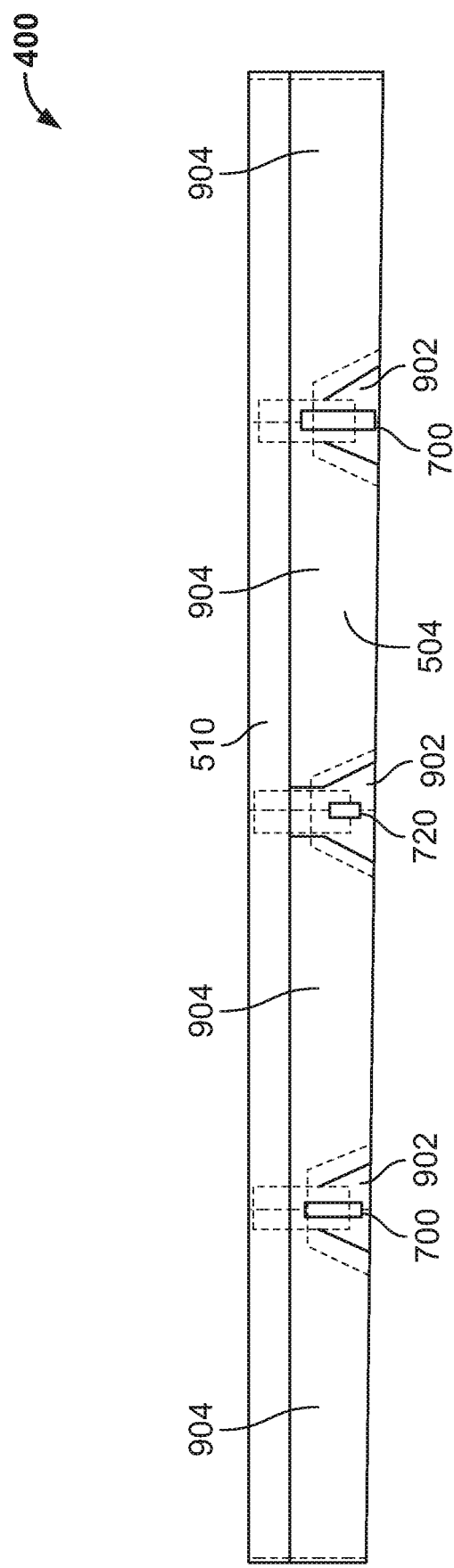

CONTINUOUS SKIN LEADING EDGE SLATS

FIELD OF THE DISCLOSURE

This disclosure relates generally to aircraft and, more particularly, to continuous skin leading edge slats.

BACKGROUND

Aircraft employ high lift devices, sometimes referred to as auxiliary airfoils, along the leading and trailing edges of the wings. For example, high lift devices along the leading edge of a wing are referred to as leading edge slats and high lift devices along the trailing edge of a wing are referred to as trailing edge flaps. The high lift devices are actuated to extend outward from the wing to change the aerodynamic lift of the wing during takeoff and landing. Each of the high lift devices is actuated by one or more drive mechanisms, which are coupled to ribs or support beams in the wing.

Some known leading edge slats employ external skins that are positioned and mounted by internal structures thereof. Particularly, a nose skin of a leading edge slat is aligned with a wedge via a spar, which is fastened mechanically and defines a joint therebetween. However, this joint is usually located on an aerodynamic surface of the slat, thereby causing a geometric discontinuity, such as a seam, on the aerodynamic surface. As a result, a drag coefficient of the slat can be relatively high, thereby causing higher fuel consumption and, thus, associated costs.

SUMMARY

An example leading edge slat includes a single-piece nose skin defining upper and lower external surfaces of the leading edge slat, where the single-piece nose skin is to extend between a fore end and an aft end of the leading edge slat, and a box spar coupled to an inner surface of the single-piece nose skin. The box spar includes lateral walls extending away from the inner surface of the single-piece nose skin. The lateral walls define at least one compartment of the box spar.

An example wing of an aircraft includes a fixed wing portion defining aerodynamic surfaces of the aircraft, and a leading edge slat movably coupled to the fixed wing portion. The leading edge slat includes a single-piece nose skin to define upper and lower external surfaces of the leading edge slat, where the single-piece nose skin is to extend between a fore end and an aft end of the leading edge slat, and a box spar coupled to an inner surface of the single-piece nose skin, where the box spar includes lateral walls that extend away from the inner surface and define at least one compartment of the box spar.

An example method includes placing a single-piece nose skin onto an assembly fixture, the single-piece nose skin to define upper and lower surfaces of a leading edge slat, where the single-piece nose skin is to extend between a fore end and an aft end of the leading edge slat, and where the fixture has a cavity shaped to receive at least a portion of the upper and lower surfaces. The example method also includes coupling a box spar to an inner surface of the single-piece nose skin while the single-piece nose skin is in the fixture, where the box spar includes lateral walls extending away from the inner surface that define at least one compartment of the box spar.

BRIEF DESCRIPTION OF THE DRAWINGS

FIGS. 7C and 7D are cross-sectional views of the example ribs of FIGS. 7A and 7B, respectively.

FIG. 8 is a perspective view of the example single-piece nose skin of the example leading edge slat of FIGS. 4-7D.

FIG. 9 is a rear view of the example leading edge slat of FIGS. 4-8.

Figure 1:
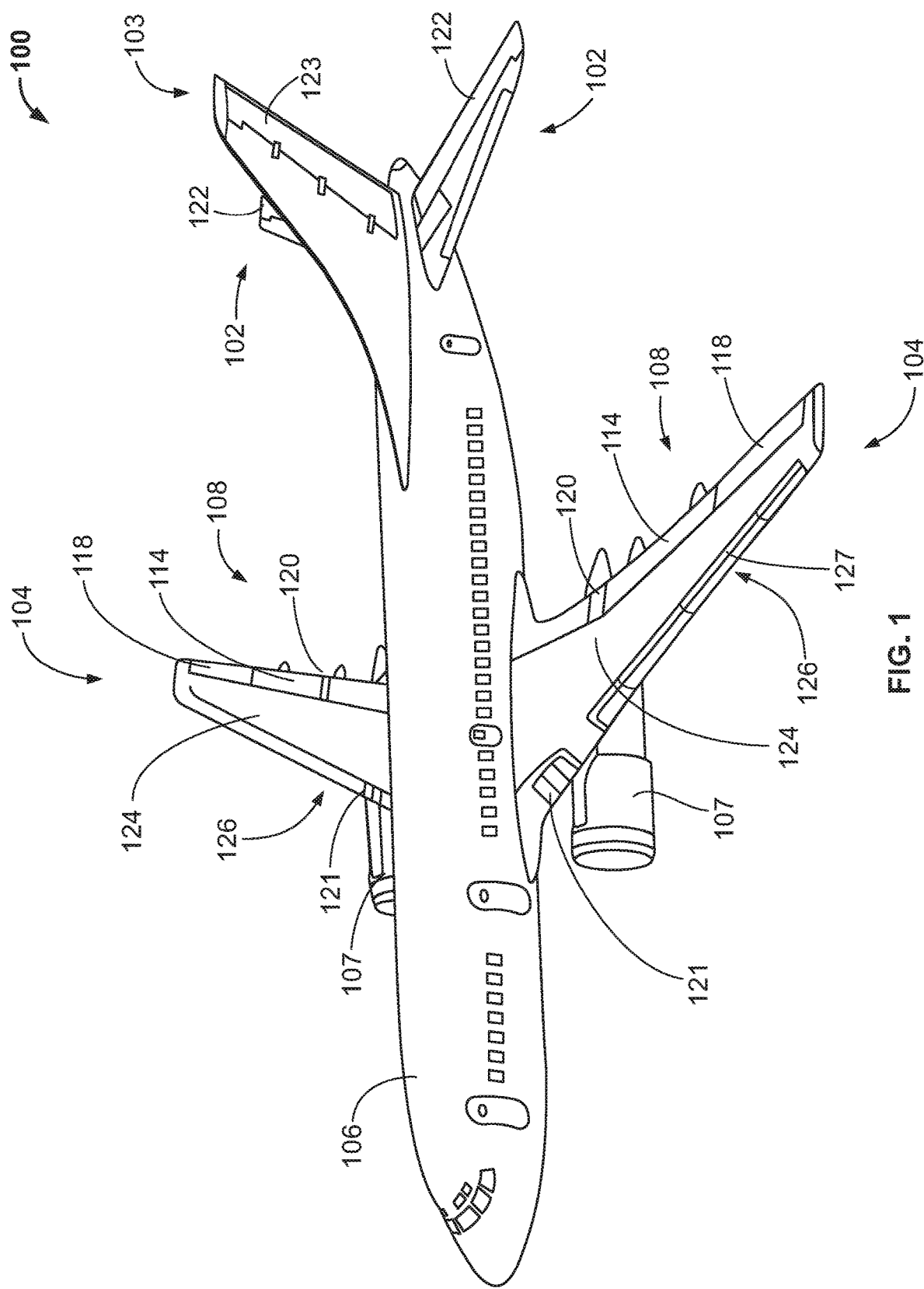
FIG. 1 is an aircraft in which examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Continuous skin leading edge slats are disclosed. Some known leading edge slats employ external skins that are positioned and assembled together via internal structures. Particularly, in some known implementations, an external nose skin is aligned with a wedge via an internal spar or spar bracket (e.g., a c-shaped or a j-shaped spar bracket), which defines a joint therebetween. However, this joint is usually located at an aerodynamic surface, thereby causing a geometric discontinuity thereon. As a result, a corresponding drag coefficient can be relatively high and, thus, significant fuel consumption and costs may be encountered.

Examples disclosed herein enable an aerodynamically efficient implementation for a leading edge slat (e.g., a leading edge slat assembly) or any other appropriate type of aircraft control surface. The example leading edge slat includes a single-piece nose skin with a metal bond assembly coupled thereto. In particular, the example single-piece nose skin defines both upper and lower external surfaces of the leading edge slat and extends between a fore end and an aft end of the leading edge slat. In examples disclosed herein, a box spar of the aforementioned metal bond assembly is coupled to an inner surface of the single-piece nose skin. The box spar includes lateral walls extending away from the inner surface that define at least one compartment of the box spar to provide structural support for the single-piece nose skin. The single-piece nose skin results in a relatively smooth and continuous external surfaces and, thus, provides a reduced drag coefficient. Further, examples disclosed herein can reduce costs and assembly part counts and, in turn, an overall weight associated with the leading edge slat.

In some examples, a spar bonded to the single-piece nose skin may be T, J, I or box shaped. In some examples, ribs extend between the single-piece nose skin and the box spar. In some examples, the box spar is coupled to the inner surface of the single-piece nose skin via an epoxy adhesive. In some examples, a trailing edge of the leading edge slat and/or the single-piece nose skin is machined to define a relatively thin and/or contoured distal trailing edge of the slat. In some examples, the leading edge slat includes a cove skin assembled and/or coupled thereto with cove openings for access to an interior of the leading edge slat. In some examples, a fixture shaped to receive the single-piece nose skin is implemented to facilitate coupling of the metal bond assembly to the single-piece nose skin.

As used herein, the term "box spar" refers to a spar and/or a spar structure having a rectangular shape and/or overall characteristic shape. Accordingly, the term "box spar" can refer to a spar structure that includes T, J or I shaped portions and defines at least one open compartment (e.g., a five-sided open compartment). As used herein, the terms "metal bond assembly" and "wedge assembly" refer to an assembly of components used to retain, mount and/or align other components of a leading edge slat. As used herein, the term "single-piece" in the context of an aerodynamic surface/component, such as an external aerodynamic skin, refers to the aerodynamic surface/component being relatively continuous and not exhibiting significant geometric discontinuities, component transitions, gaps and/or seams.

FIG. 1 illustrates an example aircraft 100 in which examples disclosed herein can be implemented. In the illustrated example, the aircraft 100 includes horizontal tails 102, a vertical tail 103 and wings (e.g., fixed wings) 104 attached to a fuselage 106. The wings 104 of the illustrated example have engines 107, and control surfaces (e.g., flaps, ailerons, tabs, etc.) 108, some of which are located at a trailing edge or a leading edge of the wings 104. The control surfaces 108 may be displaced or adjusted (e.g., deflected, etc.) to provide lift during takeoff, landing and/or flight maneuvers. In some examples, the control surfaces 108 are operated (i.e., displaced) independently of one another. The example control surfaces 108 include trailing edge flaps (e.g., rotatable flaps) 114, ailerons 118, flaperons 120, leading edge Krueger flaps 121 and leading edge slats 127. In this example, the horizontal tails 102 include elevators 122 and the vertical tail 103 includes a rudder 123. The wings 104 also define upper and lower surfaces (e.g., upper and lower sides, upper and lower aerodynamic surfaces, etc.) 124, 126, respectively.

To control flight of the aircraft 100, the control surfaces 108 alter the lift and pitch of the aircraft 100. The control surfaces 108 of the illustrated example also play a role in controlling the speed of the aircraft 100. Any of the control surfaces 108 of the illustrated example may be independently moved (e.g., deflected) to control the load distribution in different directions over the wings 104, thereby directing movement of the aircraft 100. In some examples, during cruise of the aircraft 100, the control surfaces 108 are moved to reduce the drag of the aircraft 100.

Examples disclosed herein may be applied to any of the control surfaces 108, the Krueger flaps 121, the slats 127, the flaps 114, the ailerons 118, the flaperons 120, the tails 102, 103, the wings 104, the fuselage 106, the engines 107 and/or any other exterior or outboard structure (e.g., a horizontal stabilizer, a wing strut, an engine strut, a canard stabilizer, etc.) of the aircraft 100. Additionally or alternatively, in some examples, the fuselage 106 has control surfaces, which may be deflected, to alter the flight maneuvering characteristics during cruise and/or takeoff of the aircraft 100.

Figure 2:
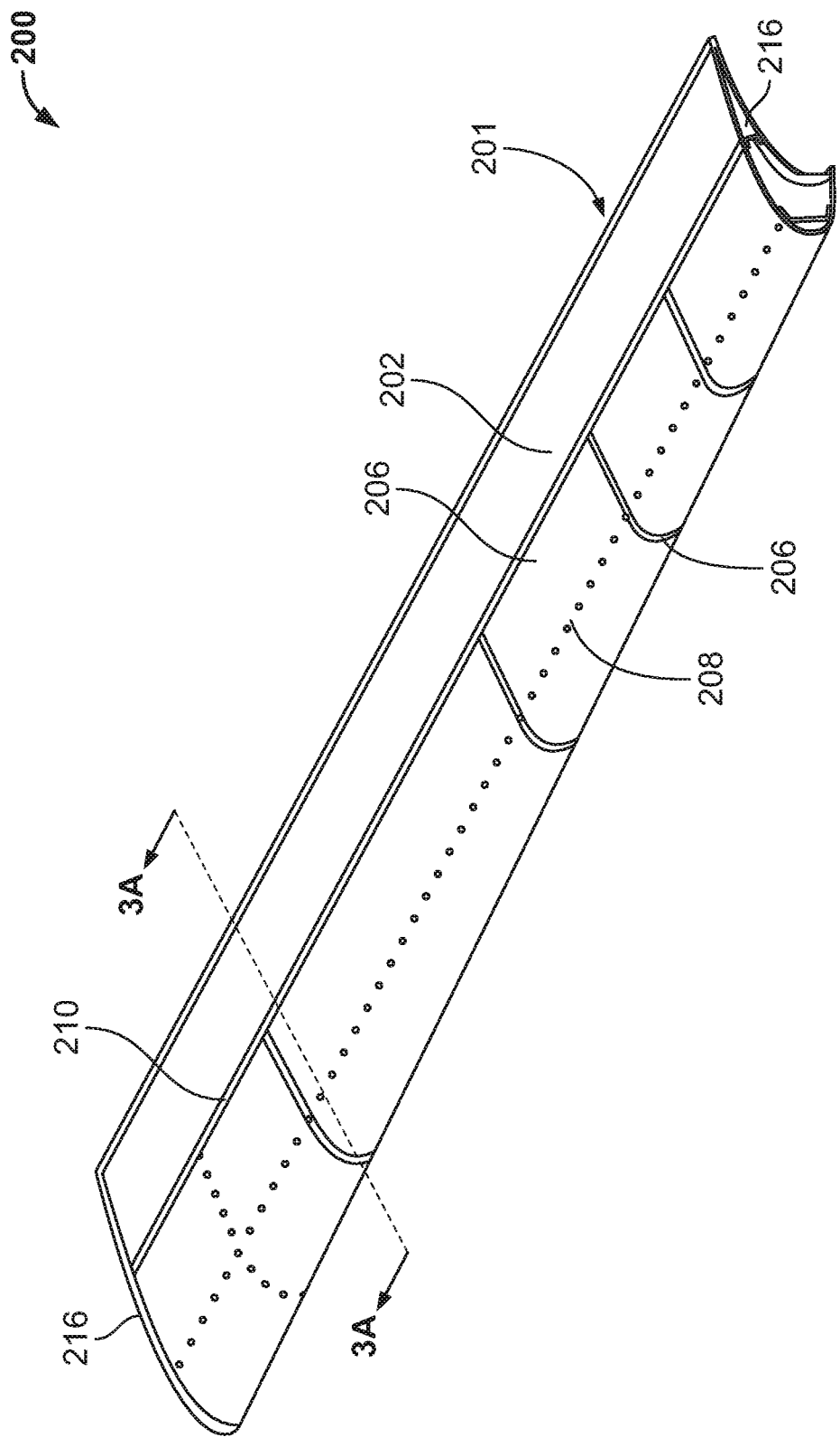
FIG. 2 is a perspective view of a known leading edge slat.

Turning to FIG. 2, a known leading edge slat 200 is shown. In this known implementation, the leading edge slat 200 includes an upper external surface 201 which, in turn, includes a first upper surface 202 and a nose skin or surface 206. Further, the upper external surface 201 of the leading edge slat 200 includes first and second lines (e.g., fastener lines, seam lines, geometric discontinuities, etc.) 208, 210 that sub-divide the first upper surface 202, and the nose skin 206. The leading edge slat 200 also includes closeouts 216, which cover opposing lateral ends of the leading edge slat 200.

In operation, during flight, air flows along the upper external surface 201. However, because of the first and second lines 208, 210, this air flow can be disrupted and/or detach from the surfaces 202, 206. As a result, a drag coefficient associated with the leading edge slat 200 can be significant. In turn, additional fuel costs and/or unfavorable flight characteristics may be experienced. In contrast, examples disclosed herein enable a smooth continuous surface with minimal or no air flow disruptions, thereby reducing drag coefficient. Further, examples disclosed herein enable fewer components, which can result in overall weight reduction as well.

Figure 3A:
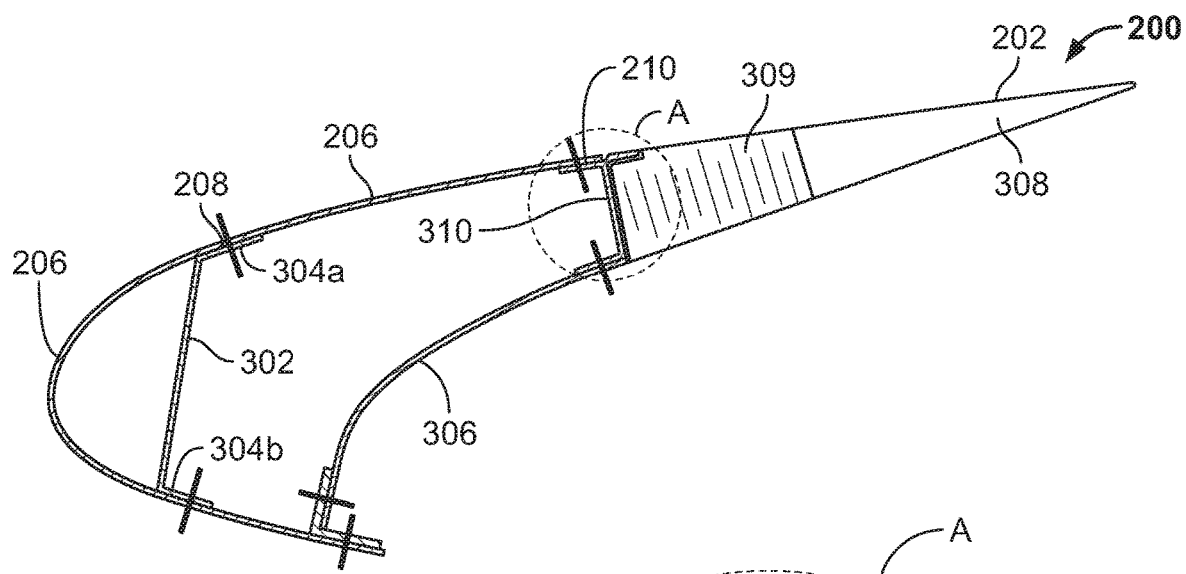
FIGS. 3A and 3B are cross-sectional views of the known leading edge slat of FIG. 2 along a line 3-3 depicted in FIG. 2.
Figure 3B:
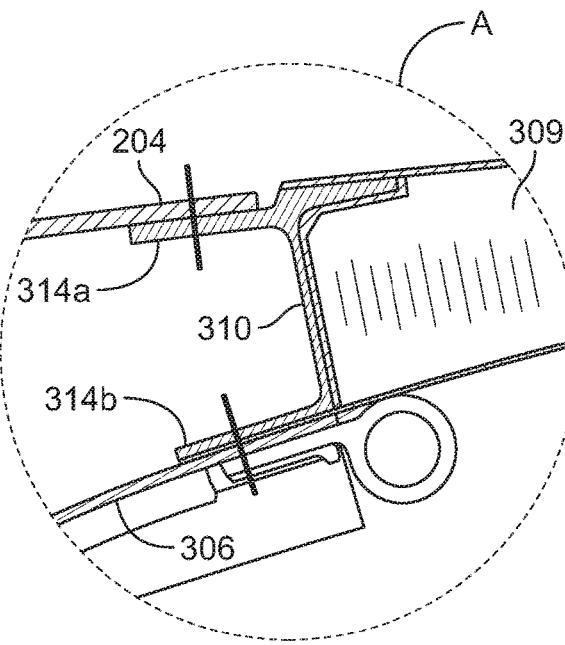

FIGS. 3A and 3B are cross-sectional views of the known leading edge slat 200 of FIG. 2 along a line 3-3 depicted in FIG. 2. Turning to FIG. 3A, the surfaces 202, 206 are separated via the line 210 while the nose skin 206 is attached to 302 via the line 208. Accordingly, the line 210 represents a seam or gap between the surfaces 202, 206, and both of the lines 208, 210 define corresponding rows of fasteners that attach the nose skin 206 to a nose beam 302. As a result, the aforementioned rows of fasteners can increase drag coefficient.

To provide support to the nose skin 206, the nose beam 302 is fastened to the nose skin 206 at flanges 304 (hereinafter flanges 304a, 304b, etc.). Further, a cove skin 306 spans a bottom area of the leading edge slat 200 while a core 309 extends from a spar (e.g., a spar wall, a spar bracket, etc.) 310 to a tip 308 that at least partially defines a distal end of the leading edge slat 200.

FIG. 3B is a detailed view of an area A shown in FIG. 3A. In the illustrated view of FIG. 3B, the spar 310 is generally j or c-shaped and aligns a surface 312 and the cove skin 306 by flanges 314 (hereinafter 314a, 314b, etc.), respectively. Further, the spar 310 adjoins the core 309.

Figure 3C:
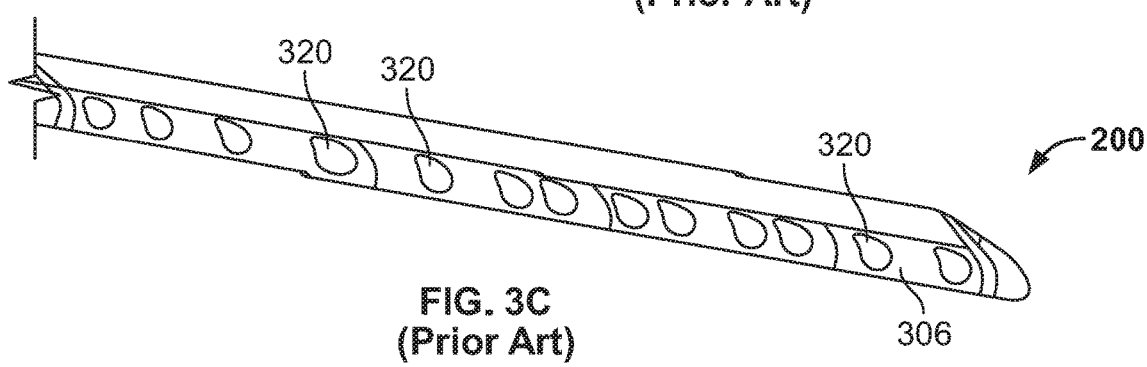
FIG. 3C is rear perspective view of the known leading edge slat of FIGS. 2-3B.

FIG. 3C is rear perspective view of the known leading edge slat 200 of FIGS. 2-3B. In this known implementation, removable access doors 320 are positioned on the cove skin 306 for access to an interior of the known leading edge slat 200.

Figure 4:
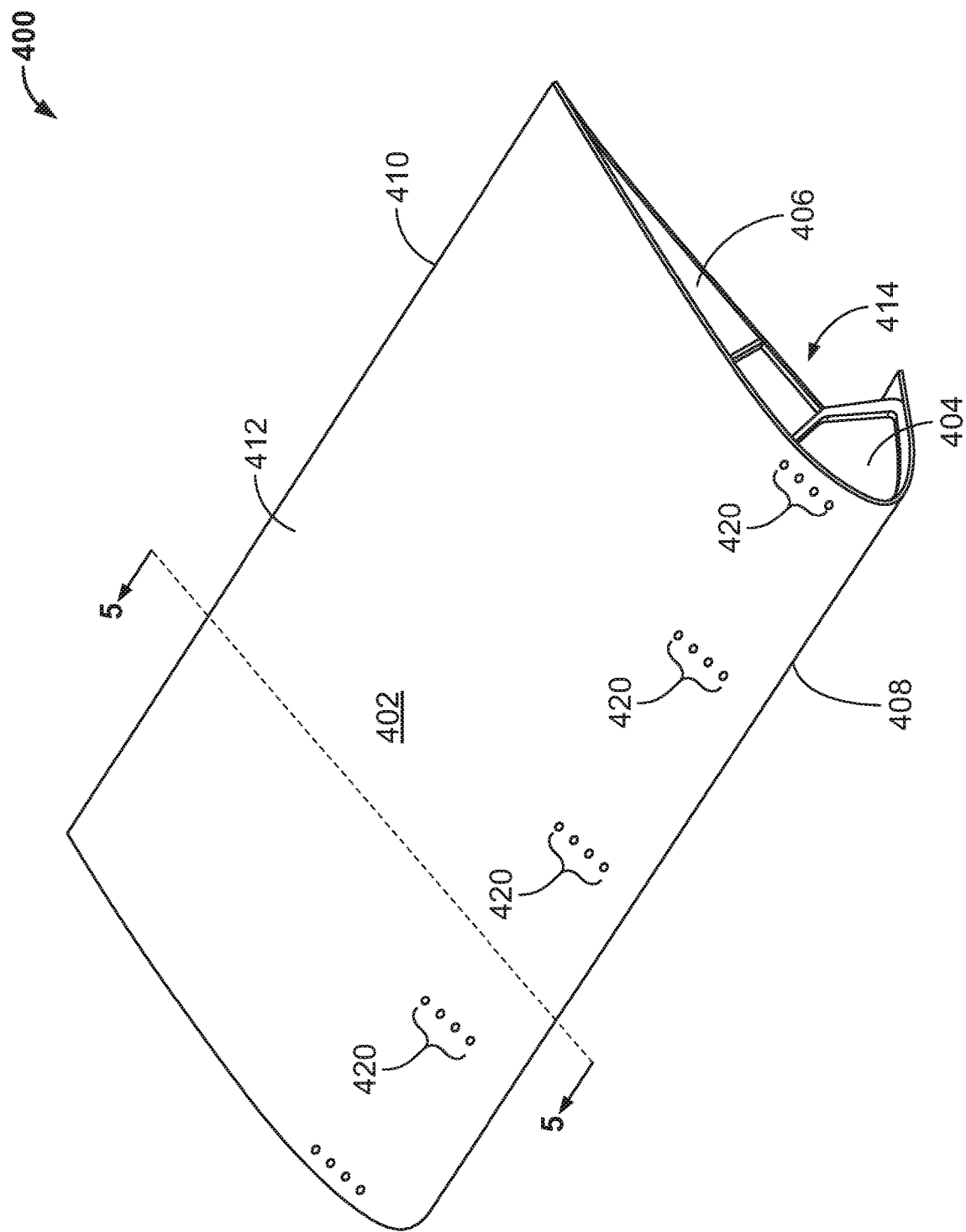
FIG. 4 is a perspective view of an example leading edge slat in accordance with teachings of this disclosure.

FIG. 4 is a perspective view of an example leading edge slat 400 in accordance with teachings of this disclosure. The leading edge slat 400 of the illustrated example is implemented on a leading edge of the wing 104 shown in FIG. 1 and includes a single-piece skin 402, and close out surfaces or walls 404, 406. In this example, the leading edge slat 400 moves (e.g., translationally moves, rotationally moves, etc.) relative to the wing 104 during flight of the aircraft 100 to direct movement and/or aerodynamic characteristics of the aircraft 100 during flight.

To provide favorable aerodynamic characteristics (e.g., a relatively low drag coefficient, etc.) during flight of the aircraft 100, the single-piece nose skin 402 is relatively continuous (e.g., has a relatively uninterrupted surface with few or no seams and/or surface interruptions). In the illustrated example, the single-piece nose skin 402 extends from a front (i.e., fore) end 408 to substantially a rear (i.e., aft) end 410 of the leading edge slat 400. Further, the single-piece nose skin 402 at least partially defines (e.g., fully defines) an upper surface 412, as well as a lower surface 414 of the leading edge slat 400. In other words, the example single-piece nose skin 402 is curved and/or bent and spans an entire flow-wise length of the leading edge slat 400 while at least partially covering both top and bottom sides of the leading edge slat 400.

By implementing examples disclosed herein, fastener rows 420 may be utilized to mount and secure the single-piece nose skin 402 to internal components and/or structure (s) of the leading edge slat 400, and are arranged in a generally flow-wise direction of the leading edge slat 400, in this example. In particular, the fasteners 420 are arranged in the aerodynamically efficient flow-wise direction, as opposed to extending in a lateral spanwise direction, as shown in the known leading edge slat 200 of FIGS. 2-3C. In other words, the example continuous single-piece nose skin 402 in combination with minimal surface features and/or irregularities defines a significant portion of an external shape of the leading edge slat 400. As a result of the relatively smooth and continuous outer shape of the single-piece nose skin 402, desired flow characteristics can be experienced during flight of the aircraft 100. In some examples, the fasteners rows 420 may not be in a flow-wise direction (e.g., swept wing configurations, etc.). Additionally or alternatively, the fastener rows 420 are aligned at approximately 0-10 degrees from the flow-wise direction.

Figure 5:
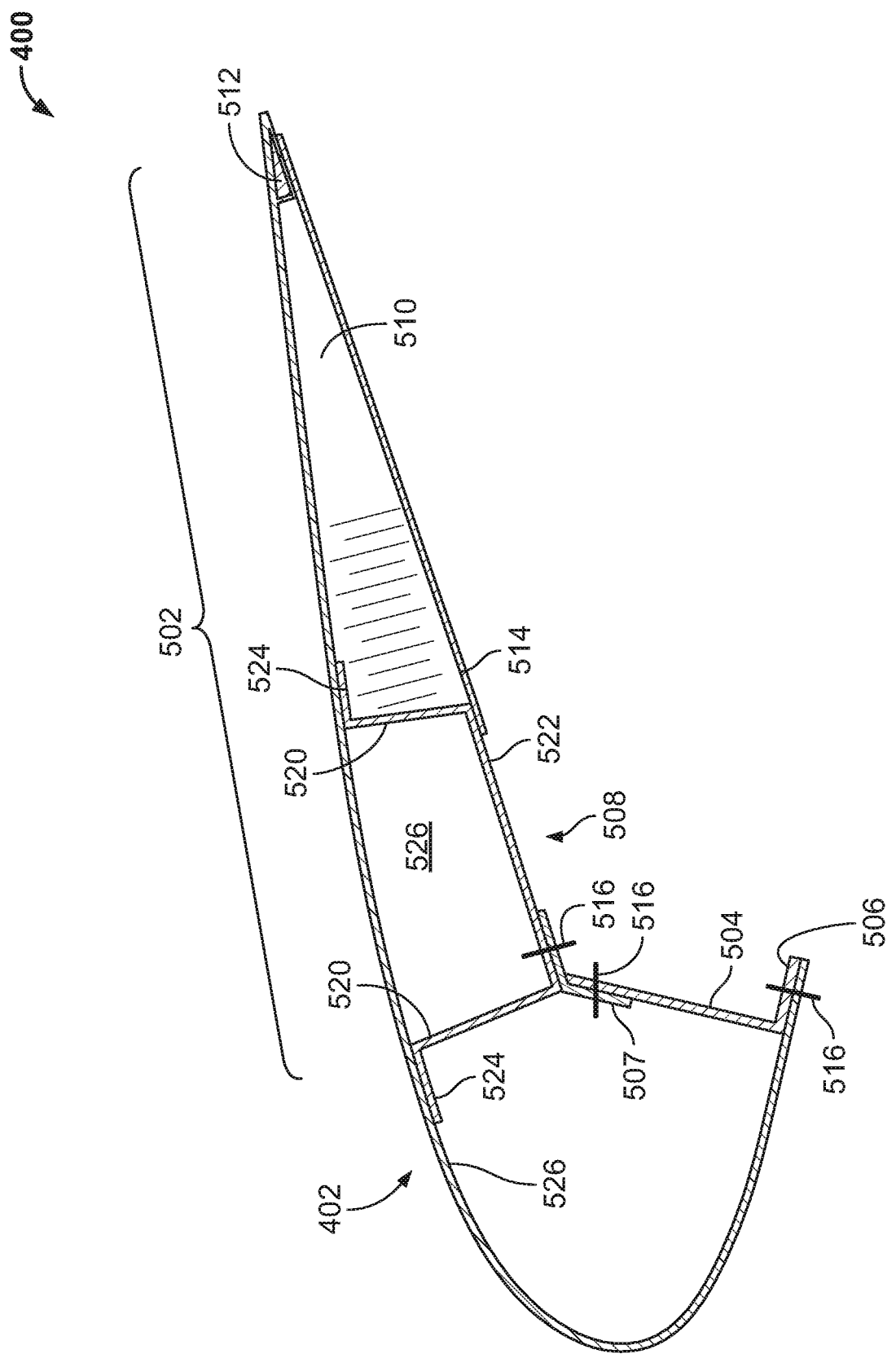
FIG. 5 is a cross-sectional view of the example leading edge slat of FIG. 4 along a line 5-5 depicted in FIG. 4.

FIG. 5 is a cross-sectional view of the example leading edge slat 400 of FIG. 4 along a line 5-5 depicted in FIG. 4. In this example, the leading edge slat 400 includes the aforementioned nose skin 402, which is shown coupled and/or bonded to a metal bond assembly 502, a cove skin (e.g., a cove bracket, a cove support, etc.) 504 with a mounting wall (e.g., a mounting flange, a mounting tab, etc.) 506, and a cove bracket 507. In this example, the metal bond assembly 502 includes a box spar (e.g., a wedge box spar, a machined box spar) 508, a core 510 and a tip (e.g., a converging tip, a ramped tip, a wedge-shape-tip, a wedge, a metal tip, etc.) 512. Additionally or alternatively, the leading edge slat 400 includes a lower skin (e.g., a lower wall, a lower edge, a lower panel, a sheet metal panel, etc.) 514. In the illustrated example, fasteners 516 couple the cove skin 504, the box spar 508 and the single-piece nose skin 402 together. In some other examples, none of the fasteners 516 are implemented (e.g., ribs are coupled to the single-piece nose skin 402 via a bonding operation for support and/or rigidity). Additionally or alternatively, the cove skin 504 and the cove bracket 507 are integral such that the fasteners 516 are, thus, eliminated. Further, the cove skin 504 at least partially defines an interior cavity 517.

To provide structural support and mount internal and external components of the leading edge slat 400, the example box spar 508 is generally box-like, cup-like and/or rectangular in shape and includes lateral walls 520 extending from a base wall 522 and an inner surface 527 of the single-piece nose skin 402. In other words, the box spar 508 is generally u-shaped, for example. As a result, the box spar 508 forms a second torsional span wise cell to a first forward main cell slat and, thus, increasing an overall stiffness. Further, the box spar 508 has flanges (e.g., mounting flanges, feet, etc.) 524 extending outwardly from the lateral walls 520 and in contact with the inner surface 527 of the single-piece nose skin 402 to further strengthen the leading edge slat 400. In this example, one of the lateral walls 520 abuts and aligns to the core 510. In this example, the box spar 508 is used to align the cove bracket 507 and, in turn, the cove skin 504, thereby providing additional internal support to the leading edge slat 400. Accordingly, the walls 520, 522 of the box spar 508 define a chamber or compartment (e.g., an internal chamber, a partially opened chamber) 526 disposed within. In particular, multiple ones of the chamber 526 are arranged contiguously along a spanwise direction (into the page of FIG. 5) of the leading edge slat 400.

The example metal bond assembly 502 and/or the box spar 508 is positioned onto the inner surface 527 of the single-piece nose skin 402, and also the lower skin 514, core 510 and/or closeout surfaces or panels are positioned onto or relative to the inner surface 520. In some examples, the lower skin 514 is implemented as an assembled and/or placed wall/panel that spans the box spar 508, the core 510 and the tip 512. In this example, both the box spar 508 and the core 510 are adjoined to the lower skin 514. In other words, the lower skin 514 may at least partially cover the box spar 508 and the core 510. Additionally or alternatively, the tip 512 is also adjoined to and/or covered by the lower skin 514. In some other examples, a welding process is used to couple the metal bond assembly 402 and/or the box spar 508 to the inner surface 527.

Figure 6A:
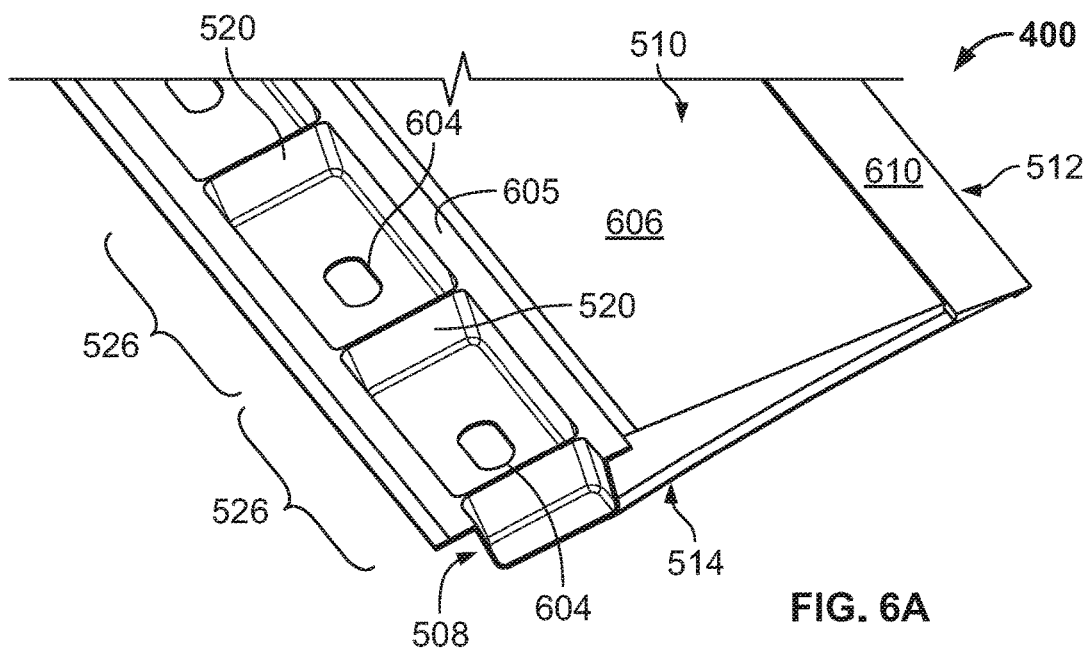
FIG. 6A is a detailed perspective view of the example leading edge slat of FIGS. 4 and 5.

FIG. 6A is a detailed perspective view of the example leading edge slat 400 of FIGS. 4 and 5 with the single-piece nose skin 402 removed for clarity. In the illustrated example, the box spar 508, the core 510, the tip 512 and the lower skin 514 are shown. Further, the example box spar 508 includes openings 604, which can be used to receive fasteners to couple the box spar 508 to the single-piece nose skin 402 during assembly of the leading edge slat 400. Further, multiple ones of the chambers 526 defined by the walls 520 are shown generally arranged along a spanwise length of the example leading edge slat 400. In other words, the chambers 526 are arranged along a single axis or direction in this example. However, additionally or alternatively, the chambers 526 can be arranged along any other direction (e.g., along a flow-wise direction, diagonally, etc.). In some examples, the box spar 508 includes tabs or flanges 605, which are used to retain (e.g., hold, position, or secure) the core 510 toward the inner surface 527 of the single-piece nose skin 402.

As can be seen in the illustrated example of FIG. 6A, both the core 510 and the tip 512 exhibit inclined or ramped portions and/or shapes. In particular, the core 510 and the tip 512 have ramped surfaces 606, 610, respectively. In this example, the ramped surfaces 606, 610 are generally aligned with one another (e.g., oriented to within about 5 degrees of one another) and, thus, can define a single ramped contour of the leading edge slat 400.

In some examples, the tip 512, the core 510 and/or the lower skin 514 are integral with the box spar 508. In other words, the tip 512, the core 510 and/or the lower skin 514 can be implemented as machined features or details (e.g., as a combination of ribs, stiffeners, a grid of ribs or stiffeners, etc.). For example, the tip 512, the core 510 and/or the lower skin 514 are defined by panels and/or portions of the box spar 508 that are adjacent to and aligned with the core 510. In some such examples, the tip 512 may be machined for a reduced thickness and/or a ramped edge to reduce drag experienced at relatively high speeds of the aircraft 100.

Figure 6B:
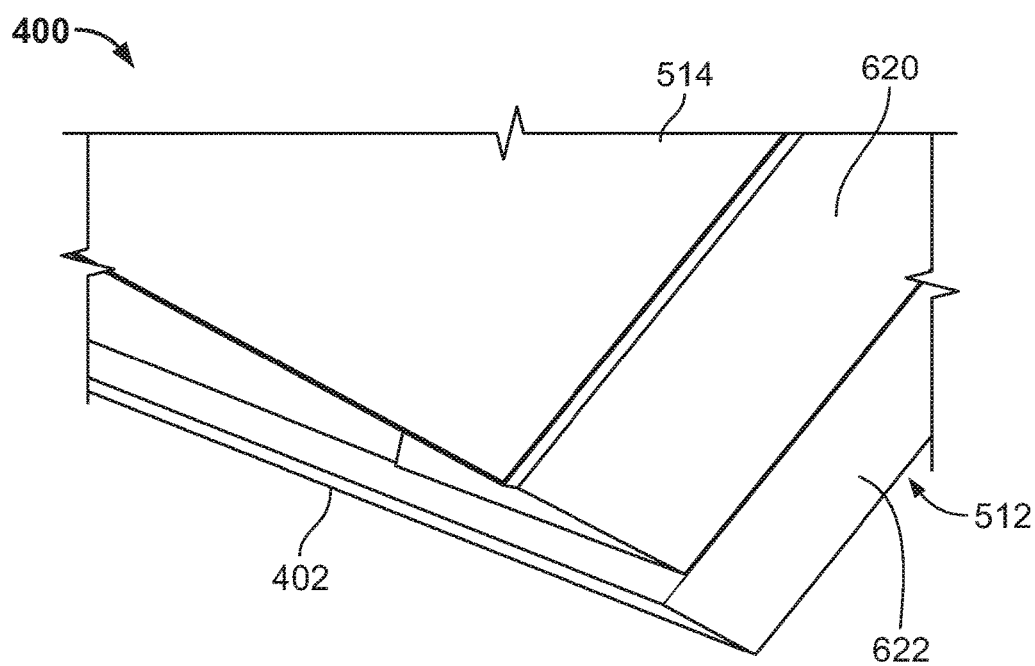
FIG. 6B is another detailed perspective of the example leading edge slat of FIGS. 4-6A.

FIG. 6B is a detailed perspective of the example leading edge slat 400 of FIGS. 4-6A that is flipped horizontally with the example single-piece nose skin 402 shown. In this particular example, a machined trailing edge is defined after a bonding (e.g., a metal bonding) operation. In the illustrated example, the tip 512 is shown disposed between the lower skin 514 and the single-piece nose skin 402. For example, both the tip 512 and the single-piece nose skin 402 are machined after bonding, thereby defining machined surfaces (e.g., ramped surfaces) 620, 622, respectively. In this example, the machined surface 622 defines a trailing edge surface. In some examples, the machined surfaces 620, 622 are contoured to generally match one another (e.g., same or similar cut angles, an aligned matching intersection therebetween, etc.).

Figure 6C:
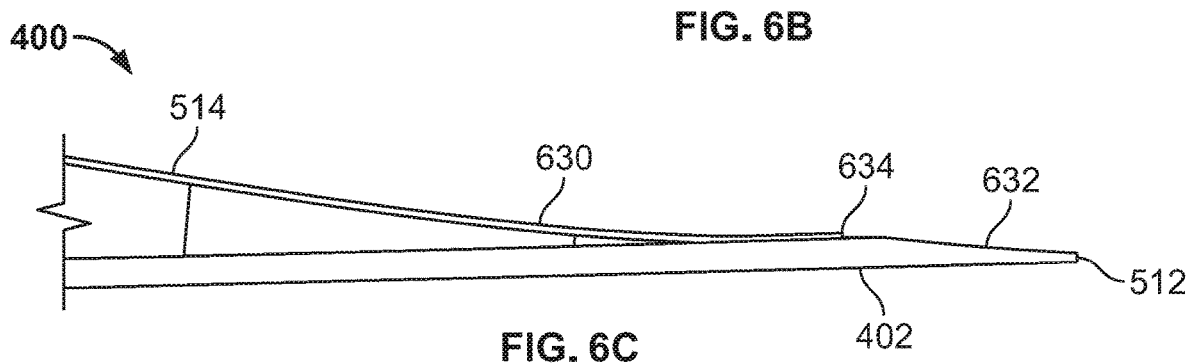
FIG. 6C is a detailed side view of the example leading edge slat of FIGS. 4-6B with an example alternative machined trailing edge design.

FIG. 6C is a detailed side view that is flipped horizontally of the example leading edge slat 400 of FIGS. 4-6B with an example alternative machined trailing edge design. In particular, the example shown in FIG. 6C depicts a bonded trailing edge implementation with fabricated chamfers into skin details prior to bonding (e.g., no machining after bonding). In this example, the tip 512 includes a machined surface 632 on the single-piece nose skin 402. In contrast to the example of FIG. 6B, the inner skin 514 has a straight (e.g., a non-inclined) portion 634.

Figure 7B:
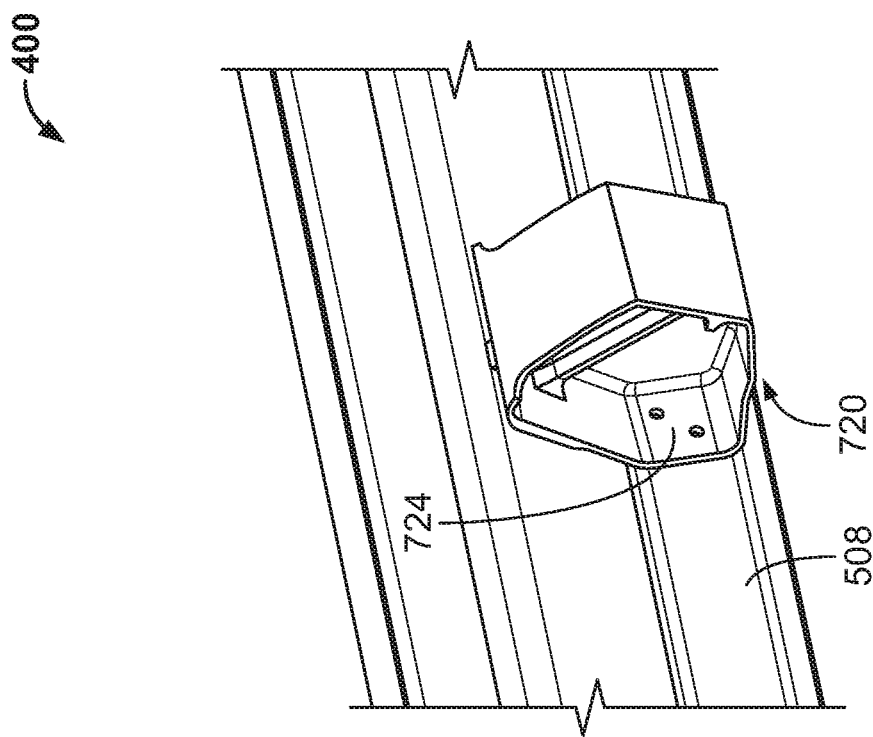
FIGS. 7A and 7B are detailed perspective views of example rib configurations that can be implemented in examples disclosed herein.
Figure 7A:
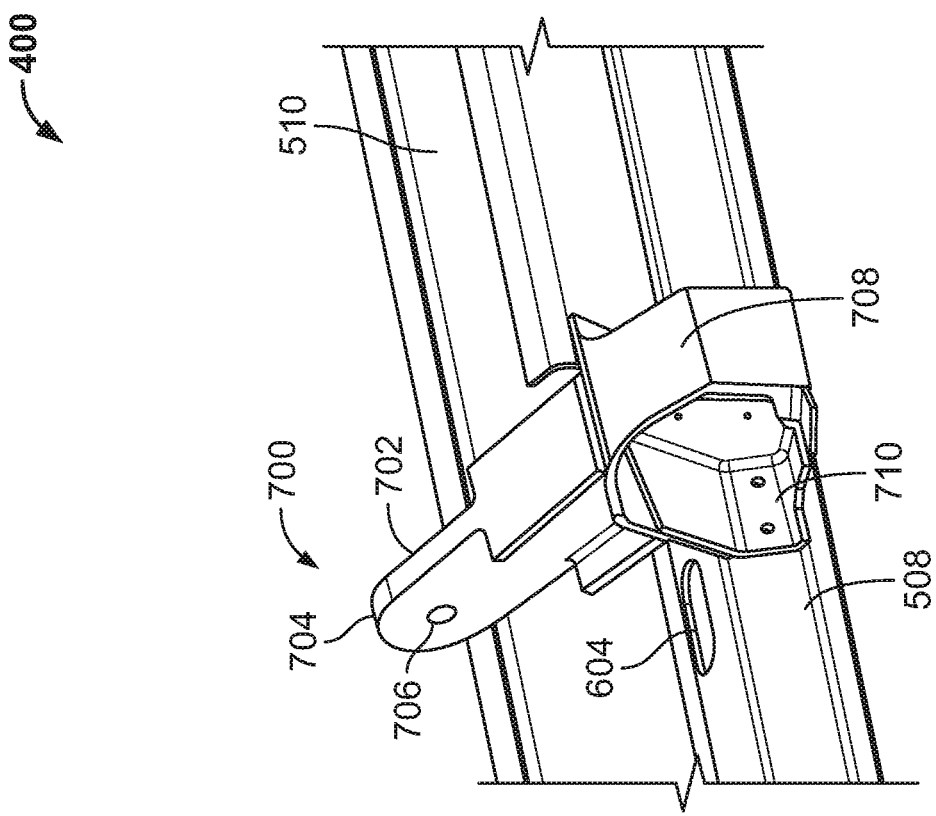

FIGS. 7A and 7B are detailed perspective views of example rib configurations that can be implemented in examples disclosed herein. Turning to FIG. 7A, a mounting rib 700 is shown mounted relative to the core 510 and the box spar 508. In particular, the example rib 700 is used to pivotably and/or translationally couple the example leading slat 400 to the respective wing 104. The rib 700 of the illustrated example includes a connection portion 702, which includes a distal end 704 and one or more mounting apertures 706. Further, the rib 700 also includes a support portion or base 708, which is coupled (e.g., fastened, adhered, etc.) to a clip 710. In turn, the clip 710 of the illustrated example is coupled to the box spar 508 (e.g., coupled to the box spar 508 via a fastener). In this example, the opening 604 enables access to fasteners (e.g., nuts, screws, etc.) inside the box spar 508 during manufacturing or servicing of the leading edge slat 400. For example, the fasteners to assemble the rib 700 to the box spar 508 can be accessed via the opening 604. In other examples, nut plates for coupling the rib 700 can be installed to the box spar 508 after the box spar 508 has been bonded to the single-piece nose skin 402.

FIG. 7B depicts an example structural rib 720. The structural rib 720 is similar to the rib 700 of FIG. 7A but, instead, implemented to reinforce the leading edge slat 400 without coupling to other components of the aircraft 100. In particular, the example rib 720 is to provide rigidity to the leading edge slat 400 while allowing the leading edge slat 400 to be relatively light weight for flight of the aircraft 100. In this example, the rib 720 is coupled to the box spar 508 at an alignment wall 724.

FIGS. 7C and 7D are cross-sectional views of the ribs 700, 720 of FIGS. 7A and 7B, respectively. Turning to FIG. 7C, a cross-sectional view of the rib 700 is shown. In this example, at least one of the mounting rib 700 or the clip 710 is mounted to the single-piece nose skin 402 via fasteners 730 at the upper surface 412. Likewise, at least one of the mounting rib 700 or the clip 710 is mounted to the single-piece nose skin 402 via fasteners 732 at the lower surface 414. Further, the rib 700 is mounted and/or coupled to the cove skin 504, as well as the box spar 508 via a fastener 734. As a result, the single-piece nose skin 402 and, generally, the leading edge slat 400 are structurally reinforced. Further, examples disclosed herein enable the rib 700 to almost fully extend throughout an inner volume of the single-piece nose skin 402 and also generally align with inner geometry of the single-piece nose skin 402, which can be structurally advantageous due to a relatively high loads of the leading edge slat 400.

Turning to FIG. 7D, the rib 720 is depicted. Similar to the rib 700, the rib 720 is coupled to the nose skin 402 with the upper and lower fasteners 730, 732, and the box spar 508 via the fastener 734. Also, a tab arm or protrusion 736 of the rib 720 extends out of an opening of the box spar 508 and/or the cove skin 504 for alignment and/or additional structural rigidity. Similar to the rib 700, the rib 720 extends through a significant portion of the inner volume of the single-piece nose skin 402.

FIG. 8 is a perspective view of the single-piece nose skin 402 of the example leading edge slat 400 shown and described above in connection with FIGS. 4-7D. As can be seen in the illustrated example of FIG. 8, the example single-piece nose skin 402 includes a top portion 801, an inflection portion 802, an aft region 803 and a bottom portion 804.

In this example, the single-piece nose skin 402 is at least partially composed of aluminum alloy (e.g., aluminum alloy 7075, etc.). Further, the single-piece nose skin 402 is also curved to define both of the aforementioned upper and lower surfaces 412, 414. In some examples, an inner/inside mold line (IML) anodized finish and/or a bond primed finish can be implemented. In some examples, the IML includes a reduced thickness region that can be reduced in thickness via machining, or alternatively, chemical milling. Laminating skins, doublers, etc. can be implemented to increase the thickness of the IML, in some examples. However, any other materials and/or finishes can be implemented instead.

While the single-piece nose skin 402 of FIG. 8 is shown curved in two dimensions in this example, the single-piece nose skin 402 may alternatively be curved in three dimensions (e.g., a complex curvature, multiple bends, etc.). In some such examples, the single-piece nose skin 402 may be curved and/or bent to define close out surfaces and/or side walls, etc.

FIG. 9 is a rear view of the example leading edge slat 400 of FIGS. 4-8. In the illustrated example, the core 510 and the cove skin 504 are shown with the ribs 700, 720. The example cove skin 504 includes non-removable portions 902 interspersed between removable portions (e.g., removable panels, removable doors, etc.) 904. The example removable portions 904 can be implemented to provide access to an interior of the leading edge slat 400 for assembly, disassembly and/or repair, etc. For example, with reference to FIG. 5, a removable portion of the cove skin 504 can provide access to the interior cavity 517 of the leading edge slat 400. In this example, the removable portions 904 are generally trapezoidal in shape. However, any appropriate shape or geometry can be implemented instead. In some examples, sensors are mounted proximate the non-removable portions 902 and/or the removable portions 904.

Figure 10:
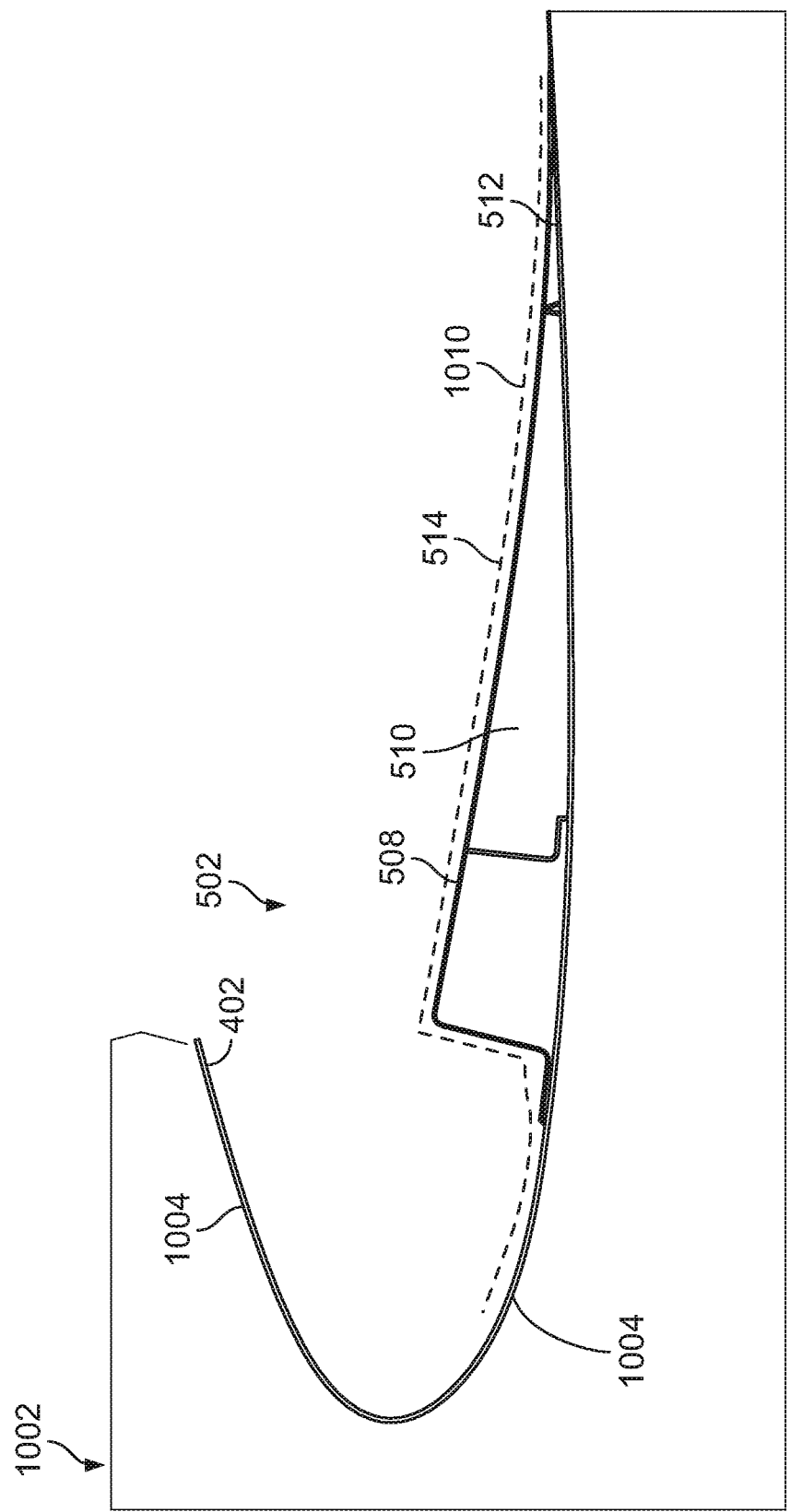
FIG. 10 is a cross-sectional view of a fixture that can be used to produce examples disclosed herein.

FIG. 10 is a cross-sectional view of a (e.g., an assembly) fixture 1002 that can be used to produce examples disclosed herein. In the illustrated example, the fixture 1002 includes a contoured surface or cavity 1004 that is complementarily shaped to receive outer surfaces of the single-piece nose skin 402. In this example, the single-piece nose skin 402 is placed onto the contoured surface 1004 prior to the metal bond assembly 502 being assembled thereto. In some examples, a vacuum bag 1010 may be implemented.

Figure 11:
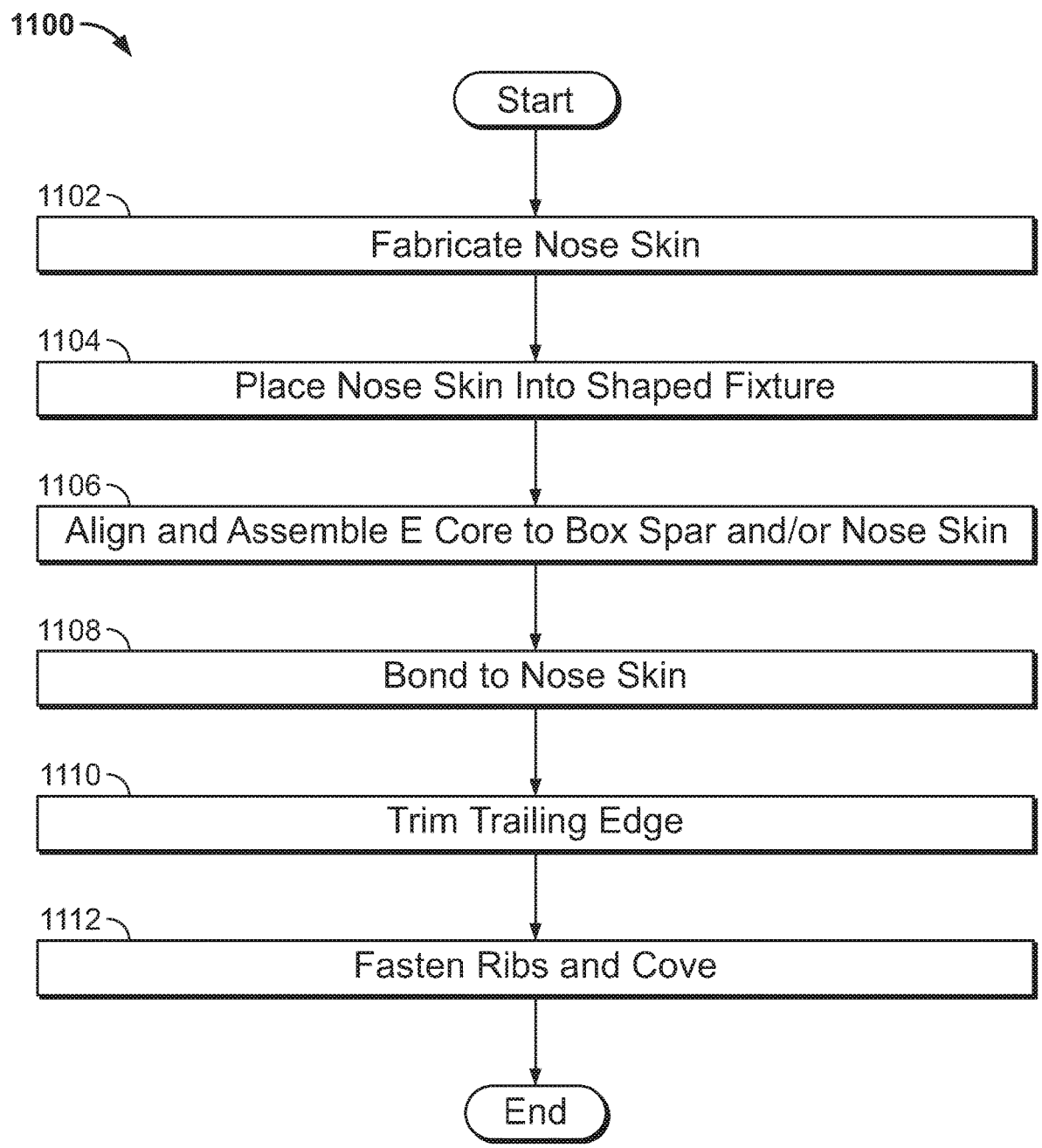
FIG. 11 is a flowchart representative of an example method to produce examples disclosed herein.

FIG. 11 is a flowchart representative of an example method 1100 to produce examples disclosed herein. The example method 1100 begins as the leading edge slat 400 is to be manufactured and assembled onto the aircraft 100.

At block 1102, in some examples, the single-piece nose skin 402 is fabricated. In particular, the example single-piece nose skin 402 is produced in a sheet metal fabrication process. In other examples, the single-piece nose skin 402 is cast, extruded, 3-D printed and/or machined.

At block 1104, the single-piece nose skin 402 is placed into the fixture 1002. In particular, the single-piece nose skin 402 is nestled into the contoured surface 1004 so that the single-piece nose skin 402 can be protected from damage and/or prevented from displacing excessively when components/assemblies are assembled, bonded and/or coupled thereto. In this example, the fixture 1002 is shaped to receive and align multiple external surfaces of the single-piece nose skin 402.

At block 1106, in some examples, components, such as the core 510 or the lower skin 514, are assembled/coupled to the box spar 508 prior to the box spar 508 being bonded/coupled to the single-piece nose skin 402. The lower skin 514 may be used to retain the core 510 and/or the tip 512 to the box spar 508.

At block 1108, the box spar 508 is coupled/bonded to the inner surface 527 of the single-piece nose skin 402 while the single-piece nose skin 402 is captivated in the fixture 1002. In this example, an epoxy adhesive (e.g., Henkel® EA-9696 as an epoxy film adhesive that cures at approximately 250 degrees Fahrenheit, a 3M® adhesive, a Cytec® adhesive, a room temperature or 350 degrees Fahrenheit curing adhesive, etc.) is used to bond the box spar 508 to the single-piece skin 402. However, any appropriate coupling method (e.g., mechanical fastening, chemical fastening, welding, etc.) can be used instead.

At block 1110, in some examples, a trailing edge is trimmed. Additionally or alternatively, the trailing edge may be machined.

At block 1112, in some examples, ribs and coves of the leading edge slat 400 are fastened and/or coupled and the process ends.

Figure 12:
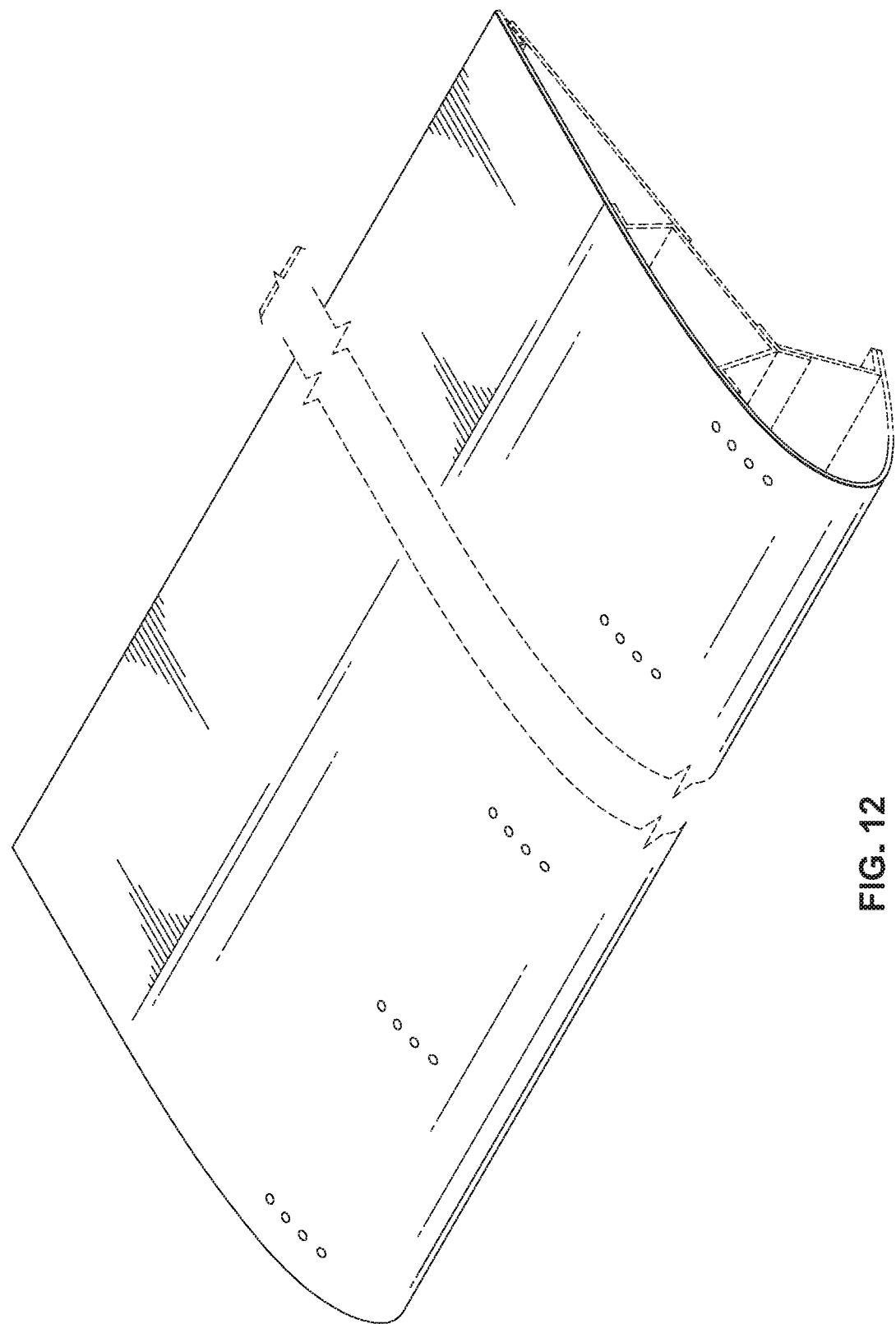
FIG. 12 is a front perspective view of fasteners in an aerodynamic structure for aircraft in which the fasteners are arranged in rows.

FIG. 12 is a front perspective view of fasteners in an aerodynamic structure for aircraft in which the fasteners are arranged in rows.

Figure 13:
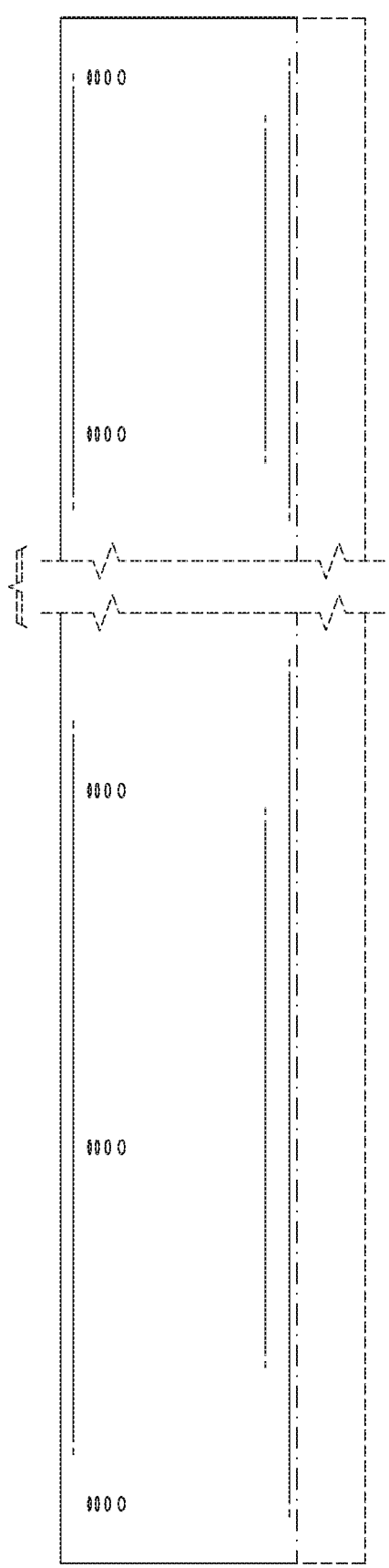
FIG. 13 is a front elevation view of the fasteners in the aerodynamic structure for the aircraft in which the fasteners are arranged in rows.

FIG. 13 is a front elevation view of the fasteners in the aerodynamic structure for the aircraft in which the fasteners are arranged in rows.

Figure 14:
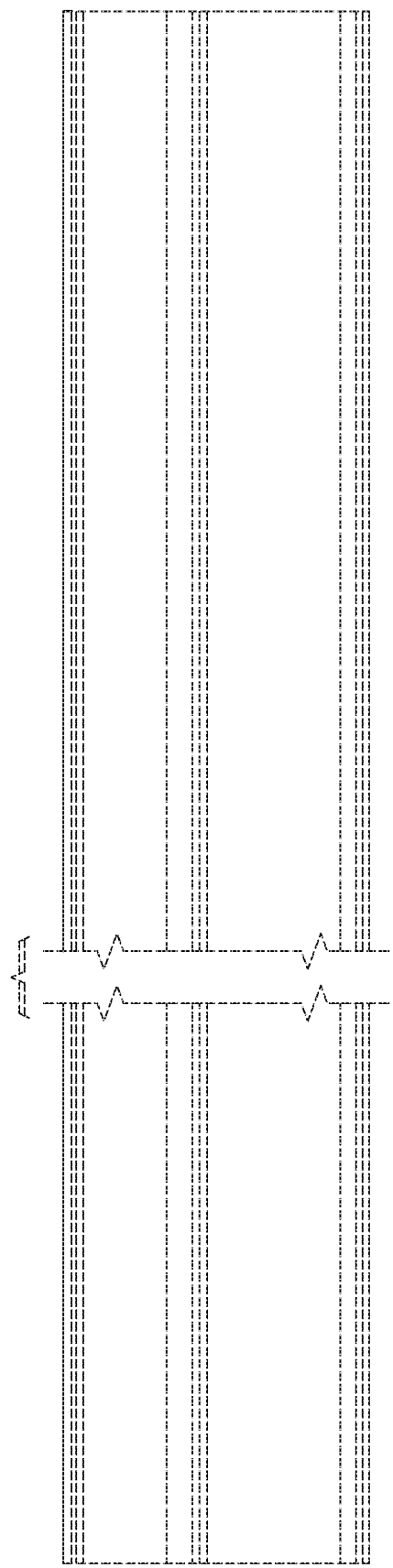
FIG. 14 is a rear elevation view.

FIG. 14 is a rear elevation view.

Figure 15:
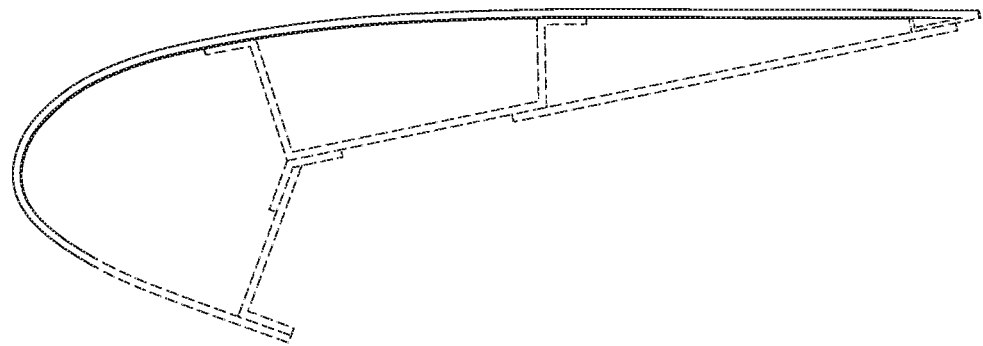
FIG. 15 is a right side view of the fasteners in the aerodynamic structure for the aircraft in which the fasteners are arranged in rows.

FIG. 15 is a right side view of the fasteners in the aerodynamic structure for the aircraft in which the fasteners are arranged in rows.

Figure 16:
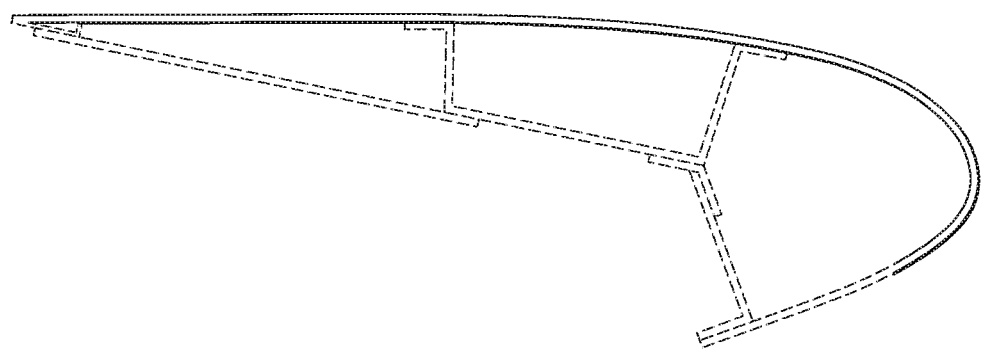
FIG. 16 is a left side view of the fasteners in the aerodynamic structure for the aircraft in which the fasteners are arranged in rows.

FIG. 16 is a left side view of the fasteners in the aerodynamic structure for the aircraft in which the fasteners are arranged in rows.

Figure 17:
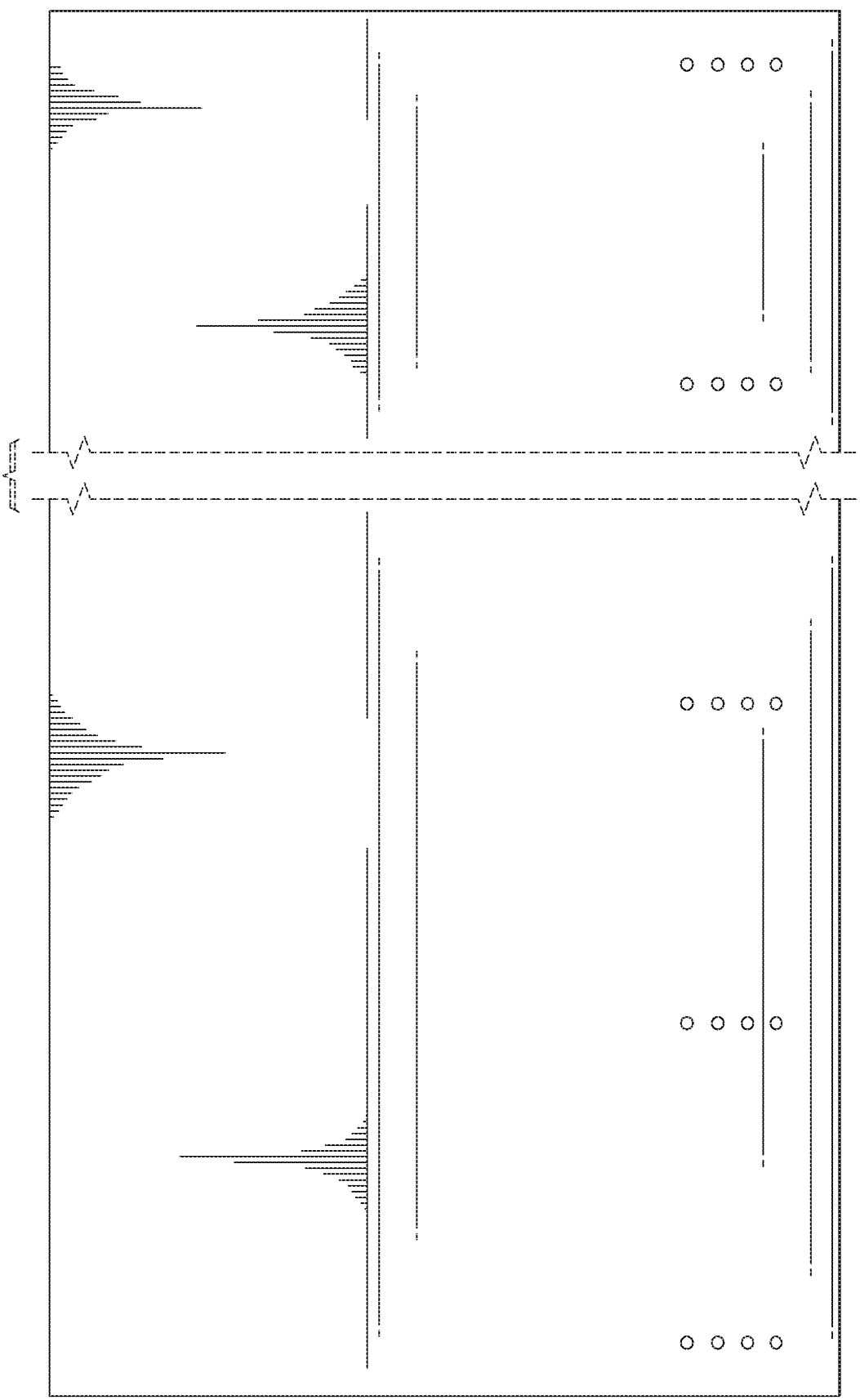
FIG. 17 is a top view of the fasteners in the aerodynamic structure for the aircraft in which the fasteners are arranged in rows.

FIG. 17 is a top view of the fasteners in the aerodynamic structure for the aircraft in which the fasteners are arranged in rows.

Figure 18:
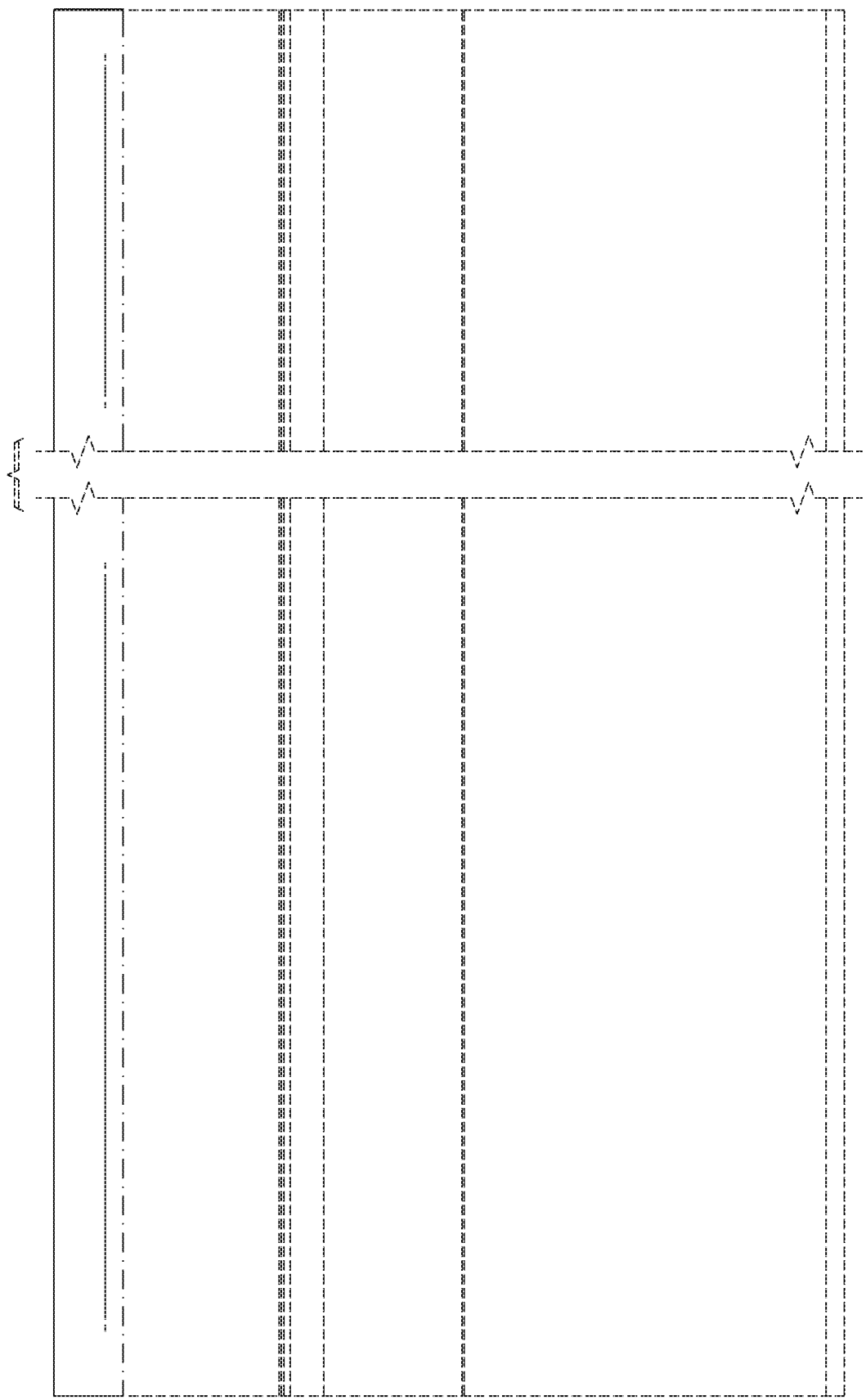
FIG. 18 is a bottom view of the fasteners in the aerodynamic structure for the aircraft in which the fasteners are arranged in rows.

FIG. 18 is a bottom view of the fasteners in the aerodynamic structure for the aircraft in which the fasteners are arranged in rows.

Figure 19:
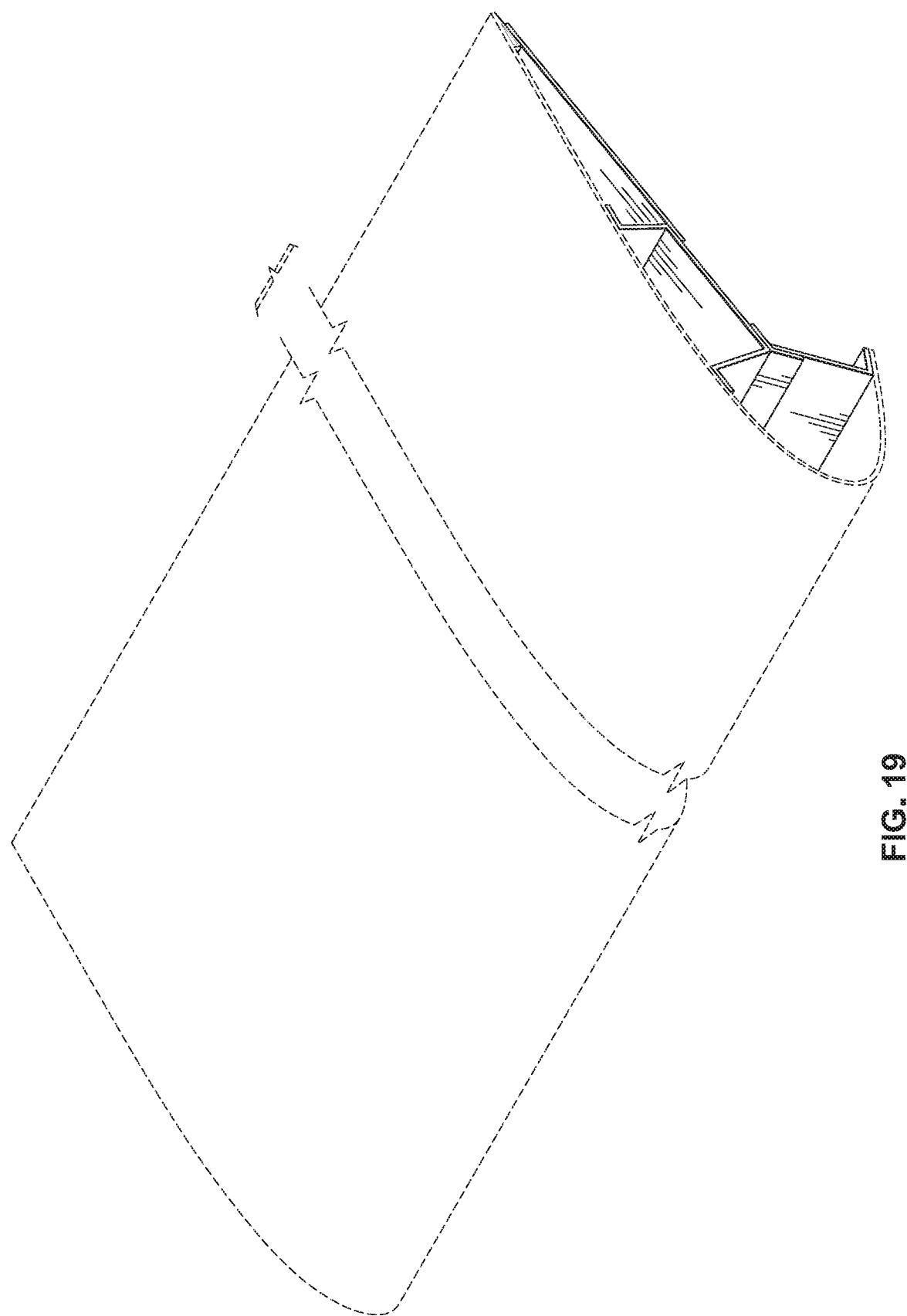
FIG. 19 is a front perspective view of an aerodynamic structure for an aircraft.

FIG. 19 is a front perspective view of an aerodynamic structure for an aircraft.

Figure 20:
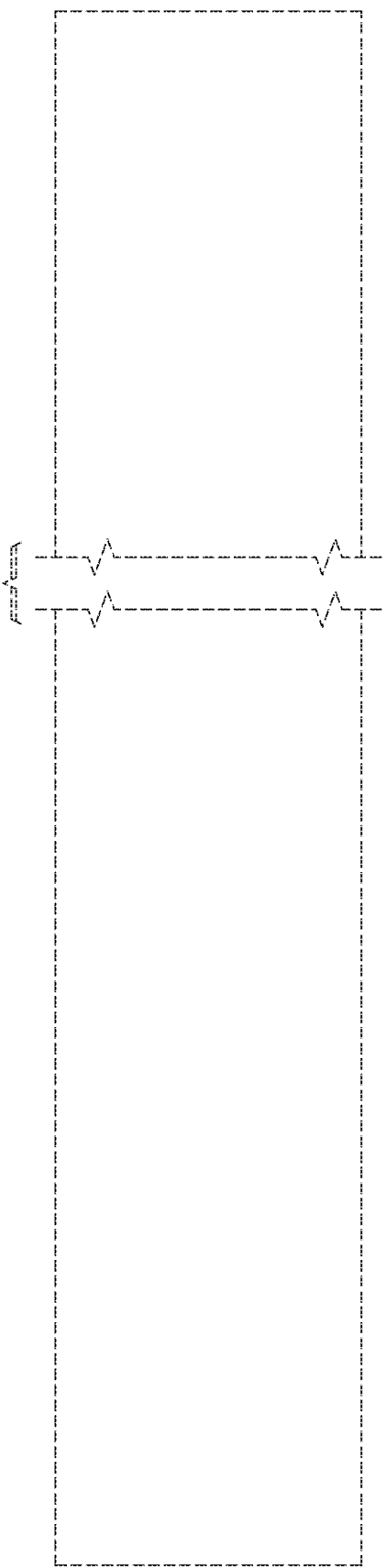
FIG. 20 is a front elevation view of the aerodynamic structure for the aircraft.

FIG. 20 is a front elevation view of the aerodynamic structure for the aircraft.

Figure 21:
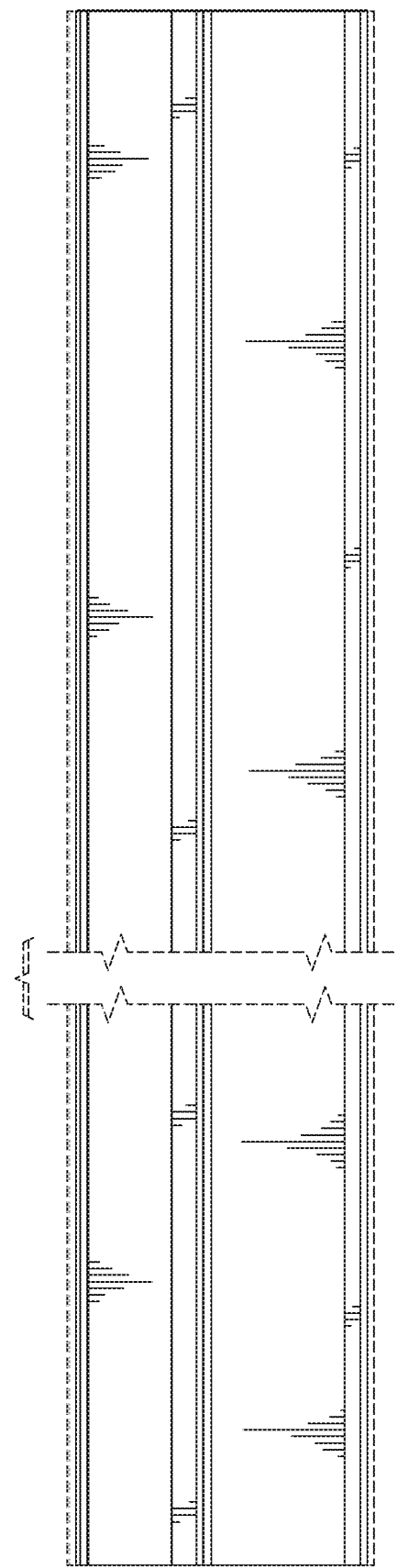
FIG. 21 is a rear elevation view of the aerodynamic structure for an aircraft.

FIG. 21 is a rear elevation view of the aerodynamic structure for an aircraft.

Figure 22:
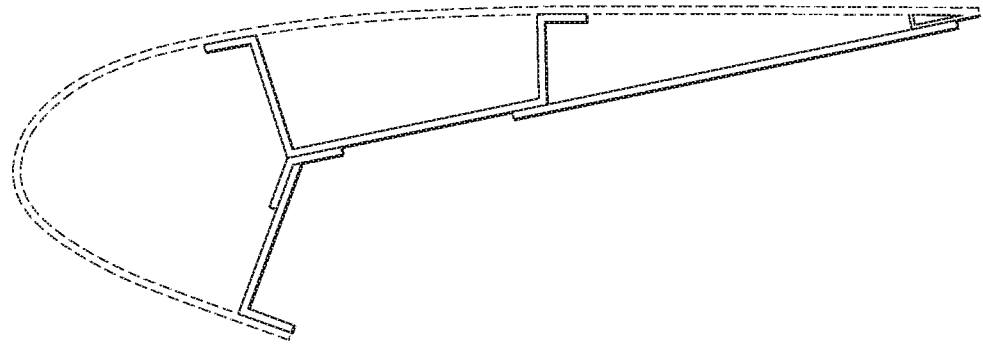
FIG. 22 is a right side view of the aerodynamic structure for the aircraft.

FIG. 22 is a right side view of the aerodynamic structure for the aircraft.

Figure 23:
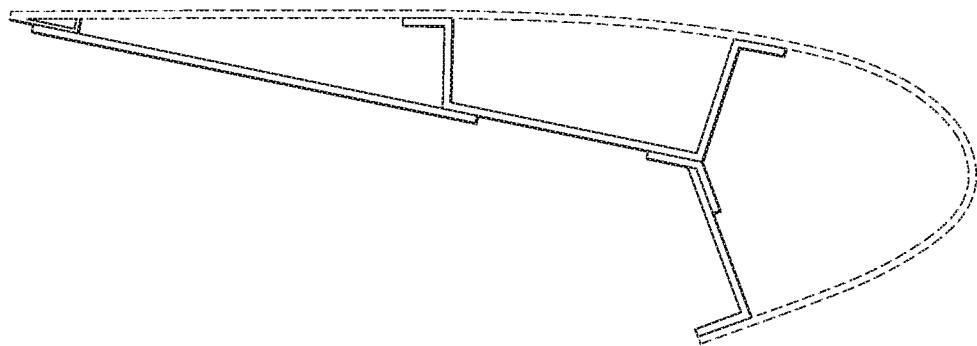
FIG. 23 is a left side view of the aerodynamic structure for the aircraft.

FIG. 23 is a left side view of the aerodynamic structure for the aircraft.

Figure 24:
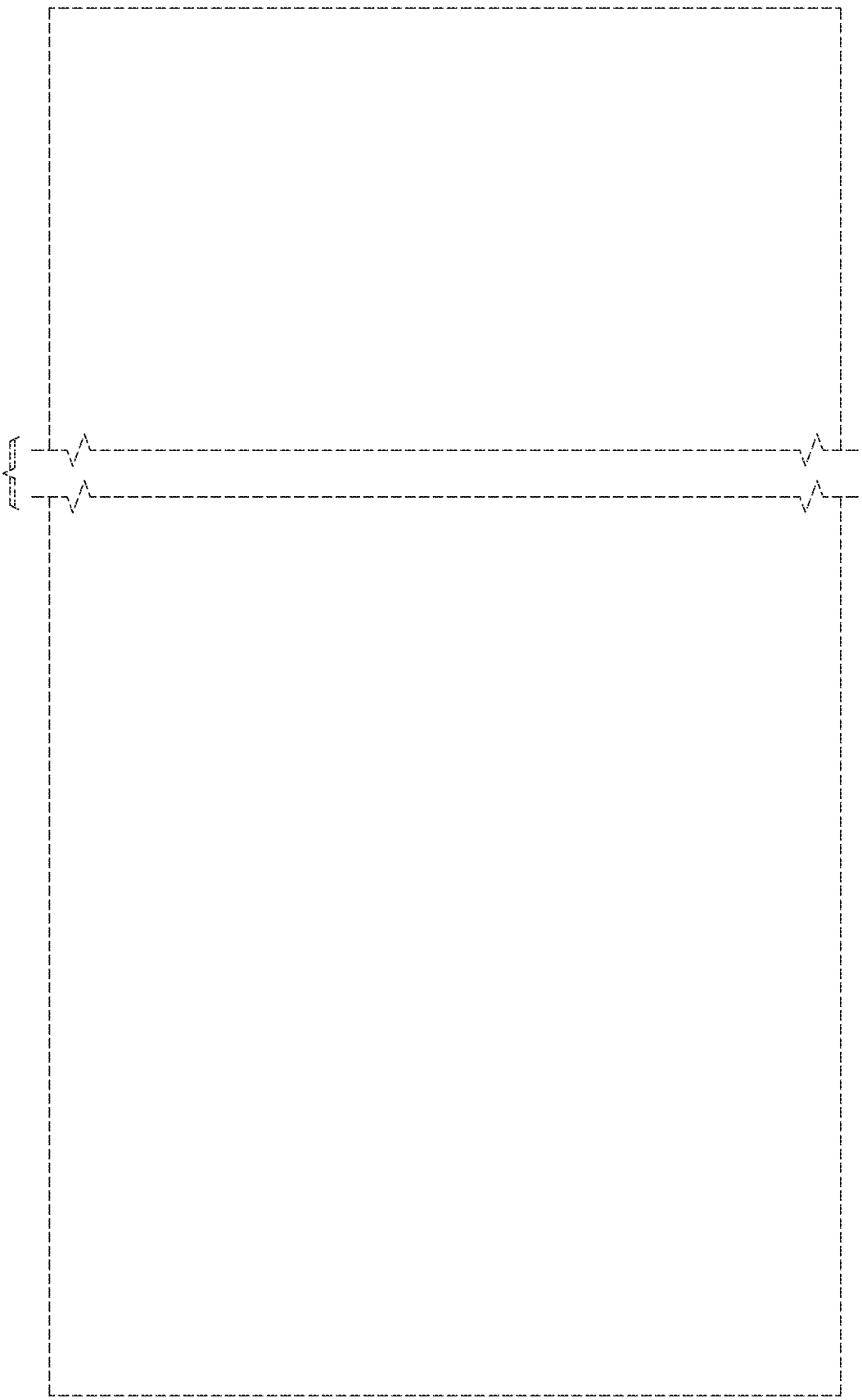
FIG. 24 is a top view of the aerodynamic structure for the aircraft.

FIG. 24 is a top view of the aerodynamic structure for the aircraft.

Figure 25:
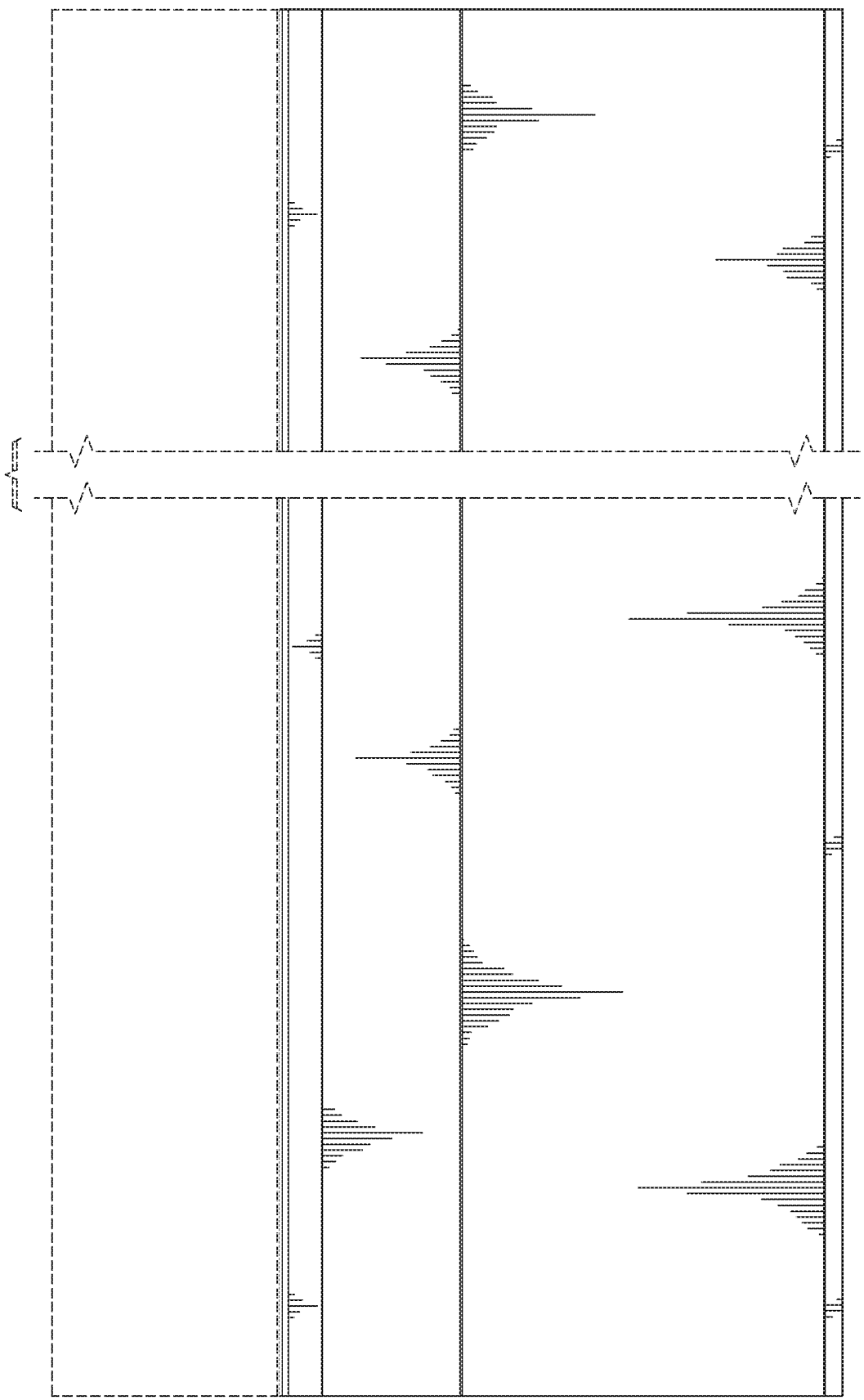
FIG. 25 is a bottom view of the aerodynamic structure for the aircraft.

FIG. 25 is a bottom view of the aerodynamic structure for the aircraft.

Example 1 includes a leading edge slat. The leading edge slat includes a single-piece nose skin defining upper and lower external surfaces of the leading edge slat, where the single-piece nose skin is to extend between a fore end and an aft end of the leading edge slat, and a box spar coupled to an inner surface of the single-piece nose skin, where the box spar includes lateral walls extending away from the inner surface of the single-piece nose skin, where the later walls define at least one compartment of the box spar.

Example 2 includes the leading edge slat as defined in Example 1, further including ribs extending between the single-piece nose skin and the box spar.

Example 3 includes the leading edge slat as defined in example 2, where the box spar includes an aperture for a fastener to couple the ribs to the single-piece nose skin.

Example 4 includes the leading edge slat as defined in any of examples 1-3, where the box spar includes a flange to retain a core to the inner surface.

Example 5 includes the leading edge slat as defined in any of examples 1-4, where the box spar is coupled to the inner surface via an epoxy adhesive.

Example 6 includes the leading edge slat as defined in any of examples 1-5, where the single-piece nose skin includes a machined trailing edge of the single-piece nose skin that extends past a tip adjacent a core.

Example 7 includes the leading edge slat as defined in example 6, further including a ramped surface of the tip, where the machined trailing edge and the ramped surface are oriented within about 5 degrees of one another.

Example 8 includes the leading edge slat as defined in any of examples 1-7, further including a cove skin coupled to the single-piece nose skin and the box spar, where the cove skin includes a removable cove panel to access an interior of the leading edge slat.

Example 9 includes a wing of an aircraft. The wing includes a fixed wing portion defining aerodynamic surfaces of the aircraft, and a leading edge slat movably coupled to the fixed wing portion. The leading edge slat includes a single-piece nose skin to define upper and lower external surfaces of the leading edge slat, where the single-piece nose skin is to extend between a fore end and an aft end of the leading edge slat, and a box spar coupled to an inner surface of the single-piece nose skin, the box spar including lateral walls that extend away from the inner surface and define at least one compartment of the box spar.

Example 10 includes the wing as defined in example 9, where the leading edge slat further includes at least one rib extending between the single-piece nose skin and the box spar.

Example 11 includes the wing as defined in example 9 or 10, where the leading edge slat further includes fasteners to couple the single-piece nose skin to the box spar.

Example 12 includes the wing as defined in example 10 or 11, where the leading edge slat is movably coupled to the fixed wing portion via the at least one rib.

Example 13 includes the wing as defined in any of examples 10-12, where the at least one rib is coupled to the upper and lower surfaces of the single-piece nose skin.

Example 14 includes the wing as defined in any of examples 9-13, where the single-piece nose skin includes a machined trailing edge that extends past a tip adjacent a core.

Example 15 includes a method including placing a single-piece nose skin onto an assembly fixture, where the single-piece nose skin is to define upper and lower surfaces of a leading edge slat, where the single-piece nose skin is to extend between a fore end and an aft end of the leading edge slat, and where the fixture has a cavity shaped to receive at least a portion of the upper and lower surfaces. The method also includes coupling a box spar to an inner surface of the single-piece nose skin while the single-piece nose skin is in the fixture, the box spar including lateral walls extending away from the inner surface that define at least one compartment of the box spar.

Example 16 includes the method as defined example 15, further including coupling a core to at least one of the single-piece nose skin or the box spar.

Example 17 includes the method as defined in example 15 or 16, where coupling the box spar to the single-piece nose skin includes application of an epoxy adhesive between the box spar and the inner surface.

Example 18 includes the method as defined in any of examples 15-17, where coupling the box spar to the inner surface includes coupling the box spar to a rib via a fastener.

Example 19 includes the method as defined in example 18, further including coupling the rib to the single-piece nose skin via a fastener.

Example 20 includes the method as defined in any of examples 15-18, where coupling the box spar to the single-piece nose skin includes coupling the box spar to a rib via a first fastener, and where the rib is coupled to the single-piece nose skin via a second fastener.

From the foregoing, it will be appreciated that example methods, apparatus and articles of manufacture have been disclosed that enable aerodynamically efficient control surfaces, such as leading edge slats, for example. Examples disclosed herein also enable cost-effective and light weight implementation of control surfaces.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure. While examples disclosed herein are shown related to leading edge slats, examples disclosed herein can be applied to any appropriate aerodynamic application or structure. Further, any appropriate alternative bonding technique or methodology can be implemented instead.

What is claimed is:

1. A leading edge slat, the leading edge slat comprising:
a single-piece nose skin defining upper and lower external surfaces of the leading edge slat, wherein the single-piece nose skin is to extend between a fore end and an aft end of the leading edge slat; and
a box spar coupled to an inner surface of the single-piece nose skin, the box spar including lateral walls extending away from the inner surface of the single-piece nose skin, the lateral walls defining at least one compartment of the box spar, the box spar including a flange to retain a core to the inner surface.

2. The leading edge slat as defined in claim 1, further including ribs extending between the single-piece nose skin and the box spar.

3. The leading edge slat as defined in claim 2, wherein the box spar is to receive a fastener to couple the ribs to the single-piece nose skin.

4. The leading edge slat as defined in claim 1, wherein the box spar is coupled to the inner surface via an epoxy adhesive.

5. The leading edge slat as defined in claim 1, wherein the flange is a first flange on first side of the box spar, and further including a second flange on a second side of the box spar that is opposite the first side.

6. The leading edge slat as defined in claim 5, wherein the first side of the box spar corresponds to the fore end of the leading edge slat, and wherein the second side of the box spar corresponds to the aft end of the leading edge slat.

7. A leading edge slat, the leading edge slat comprising:
a single-piece nose skin defining upper and lower external surfaces of the leading edge slat, wherein the single-piece nose skin is to extend between a fore end and an aft end of the leading edge slat, wherein the single-piece nose skin includes a machined trailing edge that extends past a tip adjacent a core; and
a box spar coupled to an inner surface of the single-piece nose skin, the box spar including lateral walls extending away from the inner surface of the single-piece nose skin, the lateral walls defining at least one compartment of the box spar.

8. The leading edge slat as defined in claim 7, further including a ramped surface of the tip, wherein the machined trailing edge and the ramped surface are oriented within about 5 degrees of one another.

9. A leading edge slat, the leading edge slat comprising:
a single-piece nose skin defining upper and lower external surfaces of the leading edge slat, wherein the single-piece nose skin is to extend between a fore end and an aft end of the leading edge slat;
a box spar coupled to an inner surface of the single-piece nose skin, the box spar including lateral walls extending away from the inner surface of the single-piece nose skin, the lateral walls defining at least one compartment of the box spar; and
a cove skin coupled to the single-piece nose skin and the box spar, wherein the cove skin includes a removable cove panel to access an interior of the leading edge slat.

10. A wing of an aircraft, the wing comprising:
a fixed wing portion defining aerodynamic surfaces of the aircraft; and
a leading edge slat movably coupled to the fixed wing portion, the leading edge slat including:
a single-piece nose skin to define upper and lower external surfaces of the leading edge slat, wherein the single-piece nose skin is to extend between a fore end and an aft end of the leading edge slat, and
a box spar coupled to an inner surface of the single-piece nose skin, the box spar including lateral walls that extend away from the inner surface and define at least one compartment of the box spar, the box spar including a flange to retain a core to the inner surface.

11. The wing as defined in claim 10, wherein the leading edge slat further includes at least one rib extending between the single-piece nose skin and the box spar.

12. The wing as defined in claim 11, wherein the leading edge slat is movably coupled to the fixed wing portion via the at least one rib.

13. The wing as defined in claim 11, wherein the at least one rib is coupled to the upper and lower surfaces of the single-piece nose skin.

14. The wing as defined in claim 10, wherein the leading edge slat further includes fasteners to couple the single-piece nose skin to the box spar.

15. A wing of an aircraft, the wing comprising:
a fixed wing portion defining aerodynamic surfaces of the aircraft; and
a leading edge slat movably coupled to the fixed wing portion, the leading edge slat including:
a single-piece nose skin to define upper and lower external surfaces of the leading edge slat, wherein the single-piece nose skin is to extend between a fore end and an aft end of the leading edge slat, wherein the single-piece nose skin includes a machined trailing edge that extends past a tip adjacent a core, and
a box spar coupled to an inner surface of the single-piece nose skin, the box spar including lateral walls that extend away from the inner surface and define at least one compartment of the box spar.

16. A method comprising:
placing a single-piece nose skin onto an assembly fixture, the single-piece nose skin to define upper and lower surfaces of a leading edge slat, wherein the single-piece nose skin is to extend between a fore end and an aft end of the leading edge slat, and wherein the fixture has a cavity shaped to receive at least a portion of the upper and lower surfaces; and
coupling a box spar to an inner surface of the single-piece nose skin while the single-piece nose skin is in the fixture, the box spar including lateral walls extending away from the inner surface that define at least one compartment of the box spar, wherein the box spar includes a flange to retain a core to the inner surface.

17. The method as defined claim 16, further including coupling the core to at least one of the single-piece nose skin or the box spar.

18. The method as defined in claim 16, wherein coupling the box spar to the single-piece nose skin includes application of an epoxy adhesive between the box spar and the inner surface.

19. The method as defined in claim 16, wherein coupling the box spar to the inner surface includes coupling the box spar to a rib via a fastener.

20. The method as defined in claim 19, further including coupling the rib to the single-piece nose skin via a fastener.

21. The method as defined in claim 16, wherein coupling the box spar to the single-piece nose skin includes coupling the box spar to a rib via a first fastener, wherein the rib is coupled to the single-piece nose skin via a second fastener.

* * * * *